(12) United States Patent
Inomata

(10) Patent No.: US 8,249,115 B2
(45) Date of Patent: Aug. 21, 2012

(54) SLAVE DEVICE, TIME SYNCHRONIZATION METHOD IN SLAVE DEVICE, MASTER DEVICE, AND ELECTRONIC EQUIPMENT SYSTEM

(75) Inventor: Naoki Inomata, Kanagawa (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 12/692,062

(22) Filed: Jan. 22, 2010

(65) Prior Publication Data

US 2010/0220748 A1   Sep. 2, 2010

(30) Foreign Application Priority Data

Feb. 27, 2009   (JP) ................. 2009-045102

(51) Int. Cl.
*H04J 3/06* (2006.01)
(52) U.S. Cl. ........................................ 370/503
(58) Field of Classification Search .................... 370/503
See application file for complete search history.

(56) References Cited

FOREIGN PATENT DOCUMENTS

| JP | 7-128463 | 5/1995 |
|---|---|---|
| JP | 2000-258565 | 9/2000 |
| JP | 2006-292579 | 10/2006 |
| JP | 2007-20183 | 1/2007 |

OTHER PUBLICATIONS

Office Action issued Mar. 1, 2011 in Japan Application No. 2009-045102.
John C. Eidson et al., IEEE-1588™ "Standard for a Precision Clock Synchronization Protocol for Networked Measurement and Control Systems", 10 pages.
U.S. Appl. No. 12/693,761, filed Jan. 26, 2010, Inomata.

*Primary Examiner* — Anh-Vu Ly
*Assistant Examiner* — Gbemileke Onamuti
(74) *Attorney, Agent, or Firm* — Oblon, Spivak, McClelland, Maier & Neustadt, L.L.P.

(57) ABSTRACT

A slave device includes: a clock unit that is configured by a counter so as to output time information; a clock generation unit that generates clocks for counting up the counter; a message receiving unit that receives messages sent from a master device; a message sending unit that sends messages to the master device; a first calculation unit that calculates a first value necessary for correcting the time on the clock unit; a first correction unit that corrects the time on the clock unit based on the first value calculated by the first calculation unit; a second calculation unit that calculates a second value necessary for correcting a frequency of the clocks generated by the clock generation unit; and a second correction unit that corrects the frequency of the clocks generated by the clock generation unit based on the second value calculated by the second calculation unit.

8 Claims, 10 Drawing Sheets

CHANGE IN COUNTER VALUES AT THE TIME OF TIME SYNCHRONIZATION

SLAVE DEVICE, TIME SYNCHRONIZATION METHOD IN SLAVE DEVICE, MASTER DEVICE, AND ELECTRONIC EQUIPMENT SYSTEM

BACKGROUND OF THE INVENTION

1. Field of the Invention

The present invention relates to a slave device, a time synchronization method in the slave device, a master device, and an electronic equipment system. More particularly, the present invention relates to slave devices enabling realization of perfect time synchronization with a master device.

2. Description of the Related Art

In recent years, more and more media are digitalized, and many devices recording video streams in digital forms are commercialized as represented by video cameras. Moreover, with the digitalization of video streams, an environment has become widespread in which video streams can be edited easily.

An editing operation will be considered in which video streams captured with a plurality of video cameras are combined into a single video stream. This operation uses a method that correlates the video streams with the capturing times with reference to the timestamps of the video streams to switch between video data captured at the same time, thus constructing a single video stream in which video data are arranged in accordance with the capturing times.

For this to be successful, the internal clocks of all the video cameras used should be correctly synchronized to each other. In the related art, the IEEE 1588 protocol is known to be used for achieving time synchronization of the internal clocks of each electronic equipment in an electronic equipment system in which a plurality of video cameras, for example, is connected via Ethernet (registered trademark).

As is well known in the art, according to the IEEE 1588 protocol (see "Precision Clock Synchronization Protocol for Networked Measurement and Control System"), a slave device calculates and corrects a time difference (Offset) between a master device and the slave device and a path delay (Delay) including a latency between networks or devices, thus synchronizing the time on the slave device to the time on the master device.

FIG. 8 illustrates an exemplary configuration of an electronic equipment system 200 in which time synchronization is achieved using the IEEE 1588 protocol. The electronic equipment system 200 includes a master device 210 and a slave device 220. For example, when the electronic equipment system 200 is a camera system including a plurality of video cameras, the master device 210 is a video camera serving as a parent device, and the slave device 220 is a video camera serving as a child device. Furthermore, when the electronic equipment system 200 is a control system including a controlling device (computer) and a plurality of controlled devices, the master device 210 is the controlling device, and the slave device 220 is the controlled device.

For simplicity's sake, only one slave device 220 is illustrated in FIG. 8. In addition, only those portions related to time synchronization are illustrated in FIG. 8 as the configuration of the master device 210 and the slave device 220, and other portions are omitted.

The master device 210 includes a clock unit 211, a master clock generator 212, a message sending unit 213, and a message receiving unit 214.

The clock unit 211 is configured by a counter that is counted up with master clocks CLKm that are generated by the master clock generator 212. In the case of a video system such as a camera system, the frequency of the master clocks CLKm is 27 MHz, for example, which is typically used as a reference frequency for video transfer. The time information (counter value) that is output from the clock unit 211 is supplied to the message sending unit 213 and the message receiving unit 214.

The message sending unit 213 sends a PTP (Precision Time Protocol) message to the slave device 220 via a transmission line 230 such as Ethernet (registered trademark). Here, in order to include the time information in the PTP message, it is necessary to convert the counter value serving as the time information to a value in a nanosecond (ns) unit. For this purpose, the message sending unit 213 is provided with a counter-value/ns converter 213a that performs conversion from the counter value to the value in a nanosecond (ns) unit. The message receiving unit 214 receives a PTP message that is sent from the slave device 220 via the transmission line 230.

The PTP message that the message sending unit 213 sends to the slave device 220 includes a Sync message, a FollowUp message, and a DelayResponse message. The Sync message is sent to initiate a time synchronization operation. The FollowUp message is sent to convey the time information of the master device 210 after the Sync message is sent. The DelayResponse message is sent as a response to a later-described DelayRequest message after the message receiving unit 214 receives the DelayRequest message from the slave device 220.

The slave device 220 includes a clock unit 221, a slave clock generator 222, a message receiving unit 223, a message sending unit 224, a calculation unit 225, and a correction unit 226.

The clock unit 221 is configured by a counter that is counted up with slave clocks CLKs that are generated by the slave clock generator 222. In the case of a video system such as a camera system, the frequency of the slave clocks CLKs is 27 MHz, for example, similar to the frequency of the master clocks CLKm described above, which is typically used as a reference frequency for video transfer. The time information (counter value) that is output from the clock unit 221 is supplied to the message receiving unit 223 and the message sending unit 224.

The message receiving unit 223 receives the PTP message that is sent from the master device 210 via the transmission line 230. As described above, the time information contained in the PTP message that is sent from the master device 210 is information of a value in a nanosecond (ns) unit. For this purpose, the message receiving unit 223 is provided with an ns/counter-value converter 223a that performs conversion from the value in a nanosecond (ns) unit to the counter value. The message sending unit 224 sends a PTP message to the master device 210 via the transmission line 230.

The PTP message that the message sending unit 224 sends to the master device 210 includes a DelayRequest message. The DelayRequest message is sent to request the master device 210 to issue a DelayResponse message after the FollowUp message sent from the master device 210 is received by the message receiving unit 223.

The calculation unit 225 calculates a correction value necessary for correcting the time on the clock unit 221. Specifically, the calculation unit 225 calculates, as the correction value, an offset of the time $St(x)$ on the clock unit 221 of the slave device 220 relative to the time $Mt(x)$ on the clock unit 211 of the master device 210 by the following equation (1).

$$\text{Offset} = \{(t2-t1)-(t4-t3)\}/2 \qquad (1)$$

In the equation above, time t2 is the time at which the Sync message is received by the message receiving unit 223. Time t1 is the time represented by the time information of the FollowUp message that is received by the message receiving unit 223. Time t4 is the time represented by the time information of the DelayResponse message that is received by the message receiving unit 223. Finally, time t3 is the time at which the message sending unit 224 sent (issued) the DelayRequest message to the master device 210.

The correction unit 226 corrects the time on the clock unit 221 based on the offset which is the correction value calculated by the calculation unit 225. The time St(x) on the clock unit 221, which is not corrected, is in a state such that an offset is added to the time Mt(x) on the clock unit 211 of the master device 210. Therefore, the correction unit 226 corrects the time St(x) on the clock unit 221 at the timings synchronized to the slave clocks CLKs generated from the slave clock generator 222 so that the time St(x) has a value subtracted by the offset.

FIG. 9 illustrates a sequence diagram of the time synchronization operation performed in the electronic equipment system 200 illustrated in FIG. 8.

(a) The time synchronization operation is initiated with the message sending unit 213 of the master device 210 sending a Sync message to the slave device 220. In this case, in the message sending unit 213, the issuance (sending) time t1 of the Sync message is stored in the form of the counter value which is the output of the clock unit 211.

(b) In the message receiving unit 223 of the slave device 220, the Sync message sent from the master device 210 is received, and the receipt time t2 of the Sync message is stored in the form of the counter value which is the output of the clock unit 221.

(c) Next, a FollowUp message is sent to the slave device 220 from the message sending unit 213 of the master device 210. The FollowUp message contains the time information representing the issuance time t1 of the Sync message in the form of a value in a nanosecond (ns) unit. In this case, the counter value representing the time t1 is converted to the value in a nanosecond (ns) unit by the counter-value/ns converter 213a of the message sending unit 213.

(d) In the message receiving unit 223 of the slave device 220, the FollowUp message sent from the master device 210 is received, and a value in a nanosecond (ns) unit representing the time t1 is acquired. Moreover, this value is converted to the counter value, which is the output of the clock unit 221 and represents the time t1, by the ns/counter-value converter 223a and the counter value stored in the message receiving unit 223.

(e) Next, a DelayRequest message is sent to the master device 210 from the message sending unit 224 of the slave device 220. In this case, in the message sending unit 224, the issuance (sending) time t3 of the DelayRequest message is stored in the form of the counter value which is the output of the clock unit 221.

(f) In the message receiving unit 214 of the master device 210, the DelayRequest message sent from the slave device 220 is received, and the receipt time t4 of the DelayRequest message is stored in the form of the counter value which is the output of the clock unit 211.

(g) Next, a DelayResponse message is sent to the slave device 220 from the message sending unit 213 of the master device 210. The DelayResponse message contains the time information representing the time t4 when the DelayRequest message is received by the message receiving unit 214 in the form of a value in a nanosecond (ns) unit. In this case, the counter value representing the time t4 is converted to a value in a nanosecond (ns) unit by the counter-value/ns converter 213a of the message sending unit 213.

(h) In the message receiving unit 223 of the slave device 220, the DelayResponse message sent from the master device 210 is received, and the value in a nanosecond (ns) unit representing the time t4 is acquired. Moreover, this value is converted to the counter value, which is the output of the clock unit 221 and represents the time t4, by the ns/counter-value converter 223a, and stored in the message receiving unit 223.

(i) Next, in the calculation unit 225 of the slave device 220, an offset serving as a correction value is calculated by the above-mentioned equation (1) using the counter values, which are stored in the message receiving unit 223 and represent the times t1, t2, and t4, and the counter value which is stored in the message sending unit 224 and represents the time t3. Moreover, the time St(x) on the clock unit 221 is corrected by the correction unit 226 so that the time St(x) has a value subtracted by the offset. In this way, the corrected time St(x)' on the clock unit 221 is in agreement with the time Mt(x) on the clock unit 211 of the master device 210, and synchronization is achieved.

The above-described time synchronization operation illustrated in FIG. 9 is repeated periodically, whereby the time difference (Offset) between the master device 210 and the slave device 220 is corrected and time synchronization between the master and the slave is maintained.

SUMMARY OF THE INVENTION

In the above-described time synchronization operation, the time on the master device 210 is in agreement with the time on the slave device 220 at a time when the time on the slave device 220 is corrected. However, the clock frequency is not corrected which is one of the causes of the offset generated between the time on the master device 210 and the time on the slave device 220. For this reason, after the time on the slave device 220 is corrected, the offset between the master device 210 and the slave device 220 will grow again with time. Therefore, it cannot be said that the time on the slave device and the time on the master device are not perfectly synchronized at every moment.

FIGS. 10A and 10B graphically show a change in the counter values on the clock unit 211 of the master device 210 in the above-described time synchronization operation, together with a change in the counter values on the clock unit 221 of the slave device 220. The solid line Sm in FIG. 10A shows a change in the counter values on the clock unit 211 of the master device 210. The solid line Ss in FIG. 10B shows a change in the counter values on the clock unit 221 of the slave device 220. The broken line Ss' in FIG. 10B shows an ideal change in the counter values on the clock unit 221 of the slave device 220, conforming to the change in the counter values on the clock unit 211 of the master device 210.

As illustrated in FIG. 10B, the counter values on the clock unit 221 of the slave device 220 are correct counter values at the Offset correction time points T1, T2, and so on. However, the counter values deviate gradually from the ideal counter values with time.

It is therefore desirable to realize perfect time synchronization between a master device and slave devices.

According to an embodiment of the present invention, there is provided a slave device including: a clock unit that is configured by a counter so as to output time information; a clock generation unit that generates clocks for counting up the counter; a message receiving unit that receives messages sent from a master device; a message sending unit that sends messages to the master device; a first calculation unit that calculates a first value necessary for correcting the time on the clock unit; a first correction unit that corrects the time on the clock unit based on the first value calculated by the first calculation unit; a second calculation unit that calculates a second value necessary for correcting a frequency of the clocks generated by the clock generation unit; and a second correction unit that corrects the frequency of the clocks generated by the clock generation unit based on the second value calculated by the second calculation unit, wherein: the message receiving unit receives a first message that the master device issued at a first time and a second message that contains time information representing the first time and that the master device issued at a time later than the first time; the message sending unit issues a third message to the master device at a third time; the message receiving unit receives a fourth message that contains time information representing a fourth time at which the third message is received, the fourth message being issued after the third message is received by the master device; the first calculation unit calculates a first subtraction result by subtracting the first time represented by the time information which is contained in the second message received by the message receiving unit from a second time which is the time at which the first message is received by the message receiving unit and calculates a second subtraction result by subtracting the third time at which the third message is issued by the message sending unit from the fourth time represented by the time information which is contained in the fourth message received by the message receiving unit, thereby calculating the first value by subtracting the second subtraction result from the first subtraction result and dividing a subtraction result obtained thus by 2; the first correction unit corrects the time on the clock unit so that the time has a value subtracted by the first value calculated by the first calculation unit; the message sending unit issues a fifth message to the master device at a fifth time after the time on the clock unit is corrected by the first correction unit; the message receiving unit receives a sixth message containing the time information representing a sixth time at which the fifth message is received, the sixth message being issued after the fifth message is received by the master device; the second calculation unit calculates the second value by adding an averaged sum of the first subtraction result and the second subtraction result calculated by the first calculation unit to the fifth time at which the fifth message is issued by the message sending unit; and the second correction unit corrects the frequency of the clocks generated by the clock generation unit so that the clock frequency is increased when the second value calculated by the second calculation unit is smaller than the sixth time represented by the time information which is contained in the sixth message received by the message receiving unit, and the clock frequency is decreased when the second value is larger than the sixth time.

In the above embodiment of the present invention, the first value (Offset) is calculated by the first calculation unit. The time on the clock unit is corrected by the first correction unit so that the time has a value subtracted by the first value. In this way, the clock unit of the slave device is made in agreement with the time on the clock unit of the master device.

In the above embodiment of the present invention, the second value is calculated by the second calculation unit. The second value is the result of an addition of the transmission delay components (Delay) between the master device and the slave device at the fifth time and is an estimate of the time at which the fifth message issued at the fifth time is received by the master device. When the estimate is smaller than an actual receipt time (the sixth time), the frequency of the clocks for counting up the counter of the clock unit is increased by the second correction unit. On the other hand, the estimate is larger than the actual receipt time (the sixth time), the frequency of the clocks is decreased by the second correction unit.

In this way, a change in the counter values on the counter of the clock unit of the slave device can be matched to an ideal change in the counter values conforming to a change in the counter value on the counter of the clock unit of the master device. Therefore, by repeating the correction of the time on the clock unit based on the first value and the correction of the clock frequency based on the second value, the time on the slave device can typically be made in agreement with the time on the master device rather than only at the time of correcting the offset. Thus, the slave device is able to achieve perfect time synchronization with the master device.

In the embodiment of the present invention, the time information which is contained in the second, fourth, and sixth messages received by the message receiving unit may be a counter value.

In this manner, by sending the time information from the master device to the slave device in the form of the counter value, it is not necessary to perform the operation where the master device converts the counter value to a value in a nanosecond (ns) unit, for example, and the operation where the slave device converts the value in a nanosecond (ns) unit to the counter value. For this reason, the time information supplied from the master device to the slave device will be accurate time information containing no calculation errors during the conversion. Accordingly, the slave device is able to achieve time synchronization with the master device with higher precision.

According to another embodiment of the present invention, there is provided a slave device including: a clock unit that is configured by a counter so as to output time information; a clock generation unit that generates clocks for counting up the counter; a message receiving unit that receives messages sent from a master device; a message sending unit that sends messages to the master device; a first calculation unit that calculates a first value necessary for correcting the time on the clock unit; a first correction unit that corrects the time on the clock unit based on the first value calculated by the first calculation unit; a second calculation unit that calculates a second value necessary for correcting a frequency of the clocks generated by the clock generation unit; and a second correction unit that corrects the frequency of the clocks generated by the clock generation unit based on the second value calculated by the second calculation unit, wherein: the message receiving unit receives a first message that the master device issued at a first time and a second message that contains time information representing the first time and that the master device issued at a time later than the first time; the first calculation unit calculates a first correction value as the first value by subtracting the first time represented by the time information which is contained in the second message received by the message receiving unit from a second time which is the time at which the first message is received by the message receiving unit; the first correction unit performs a first stage of correction so that the time on the clock unit has a value subtracted by the first correction value calculated by the first calculation unit; the message sending unit issues a third message to the master device at a third time after the first stage of correction is performed by the first correction unit; the message receiving unit receives a fourth message containing the time information representing a fourth time at which the third message is received, the fourth message being issued after the third message is received by the master device; the first calculation unit calculates a second correction value as the first value by subtracting the third time at which the third message is issued by the message sending unit from the fourth time represented by the time information which is contained in the fourth message received by the message receiving unit and dividing a subtraction result obtained thus by 2; the first correction unit performs a second stage of correction so that the time on the clock unit has a value added by the second correction value calculated by the first calculation unit, after the first stage of correction is performed; the message sending unit issues a fifth message to the master device at a fifth time after the second stage of correction is performed by the first correction unit; the message receiving unit receives a sixth message containing the time information representing a sixth time at which the fifth message is received, the sixth message being issued after the fifth message is received by the master device; the second calculation unit calculates a first subtraction result by subtracting the first time represented by the time information which is contained in the second message received by the message receiving unit from a second time which is the time at which the first message is received by the message receiving unit and calculates a second subtraction result by subtracting the third time at which the third message is issued by the message sending unit from the fourth time represented by the time information which is contained in the fourth message received by the message receiving unit, thereby calculating the second value by adding an averaged sum of the first subtraction result and the second subtraction result to the fifth time at which the fifth message is issued by the message sending unit; and the second correction unit corrects the frequency of the clocks generated by the clock generation unit so that the clock frequency is increased when the second value calculated by the second calculation unit is smaller than the sixth time represented by the time information which is contained in the sixth message received by the message receiving unit, and the clock frequency is decreased when the second value is larger than the sixth time.

In the above embodiment of the present invention, the first correction value and the second correction value are calculated as the first value, and the time on the clock unit of the slave device is corrected in two stages. In the first stage of correction, the first correction value is used which is calculated by subtracting the first time, at which a message is issued by the master device, from the second time at which the message is received. Then, the time on the clock unit of the slave device is corrected so that the time has a value subtracted by the first correction value. In this way, the corrected time on the clock unit of the slave device has a value corresponding to a subtraction of a transmission delay component (Delay) between the master device and the slave device from the time on the clock unit of the master device. Thus, the corrected time is in a state such that an offset component is excluded.

Moreover, in the second stage of correction, the second correction value (Delay) is used which is calculated by subtracting the third time, at which a message is sent, from the fourth time, at which the message is received by the master device, and dividing a subtraction result obtained thus by 2. Then, the time on the clock unit of the slave device is corrected so that the time has a value added by the second correction value. In this way, the time on the clock unit of the slave device is in agreement with the time on the master device, and thus time synchronization is achieved.

Therefore, when the time on the clock unit of the slave device is corrected in two stages, the time on the clock unit of the slave device is not corrected using the result of the offset calculation containing an error. For this reason, the slave device is able to achieve time synchronization with the master device with high precision.

Moreover, in the above embodiment of the present invention, the second value is calculated. The second value is the result of an addition of the transmission delay components (Delay) between the master device and the slave device at the fifth time and an estimate of the time at which the fifth message issued at the fifth time is received by the master device. When the estimate is smaller than an actual receipt time (the sixth time), the frequency of the clocks for counting up the counter of the clock unit is increased. On the other hand, when the estimate is larger than the actual receipt time (the sixth time), the frequency of the clocks is decreased. In this way, a change in the counter values on the counter of the clock unit of the slave device can be matched to an ideal change in the counter values conforming to a change in the counter value on the counter of the clock unit of the master device.

Therefore, by repeating the correction of the time on the clock unit based on the first value and the correction of the clock frequency of the clock generation unit based on the second value, the time on the slave device can typically be made in agreement with the time on the master device rather than only at the time of correcting the offset. Thus, the slave device is able to achieve perfect time synchronization with the master device.

According to the embodiments of the present invention, since the time on the slave device can typically be made in agreement with the time on the master device rather than only at the time of correcting the offset, the slave device is able to achieve perfect time synchronization with the master device.

DESCRIPTION OF THE PREFERRED EMBODIMENTS

Hereinafter, modes for carrying out the present invention (hereinafter referred to as embodiments) will be described. The description will be given in the following order.

Figure 1:
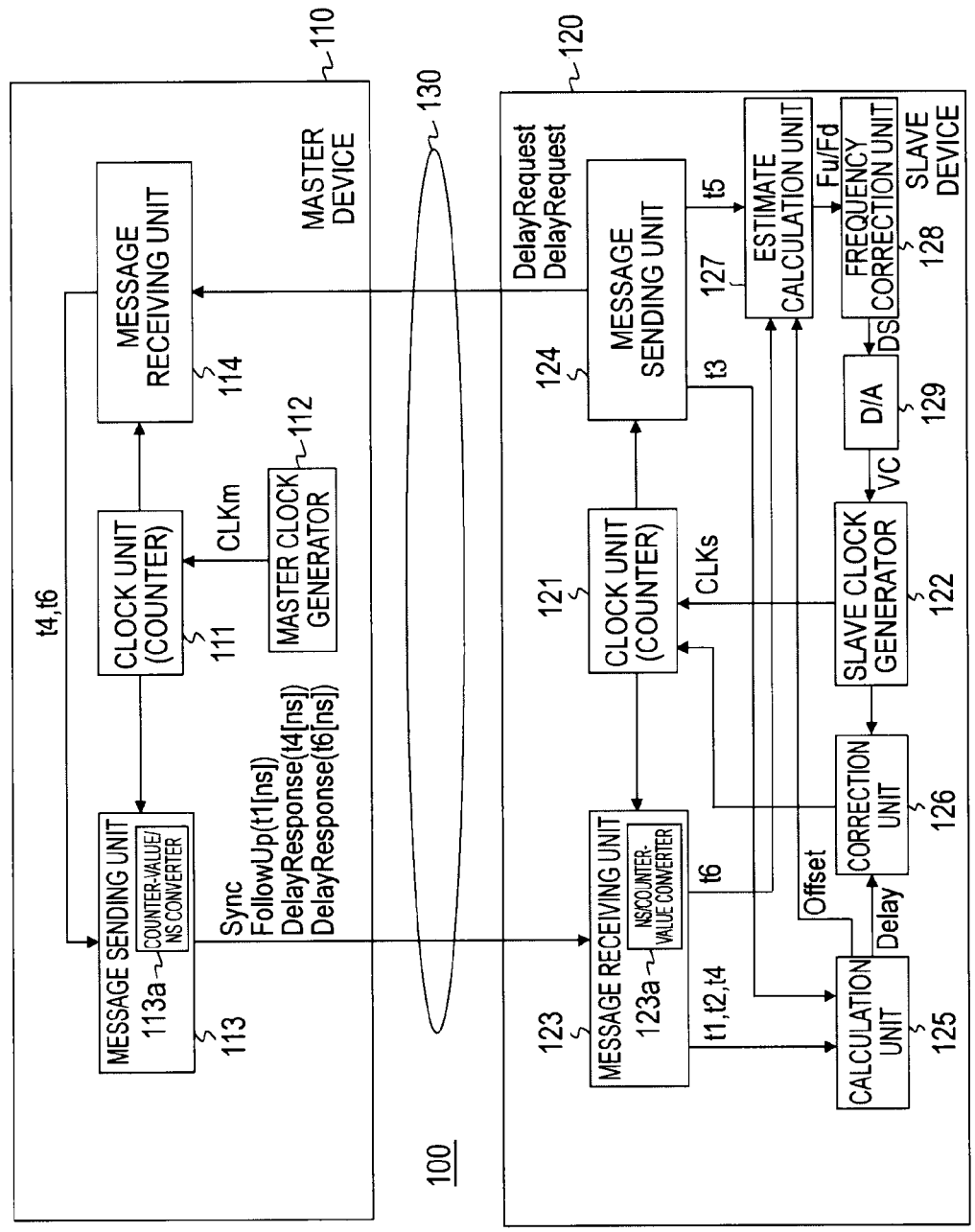
FIG. 1 is a schematic block diagram illustrating an exemplary configuration of an electronic equipment system according to a first embodiment of the present invention.

1. First Embodiment
2. Second Embodiment
3. Third Embodiment; and
4. Modified Embodiment 1. First Embodiment Exemplary Configuration of Electronic Equipment System FIG. 1 illustrates an exemplary configuration of an electronic equipment system 100 according to the first embodiment. The electronic equipment system 100 includes a master device 110 and a slave device 120. For example, when the electronic equipment system 100 is a camera system including a plurality of video cameras, the master device 110 is a video camera serving as a parent device, and the slave device 120 is a video camera serving as a child device. Furthermore, when the electronic equipment system 100 is a control system including a controlling device (computer) and a plurality of controlled devices, the master device 110 is the controlling device, and the slave device 120 is the controlled device.

For the simplicity's sake, only one slave device 120 is illustrated in FIG. 1. In addition, only those portions related to time synchronization are illustrated in FIG. 1 as the configuration of the master device 110 and the slave device 120, and other portions are omitted.

The master device 110 includes a clock unit 111, a master clock generator 112, a message sending unit 113, and a message receiving unit 114.

The clock unit 111 is configured by a counter that is counted up with master clocks CLKm that are generated by the master clock generator 112. In the case of a video system such as a camera system, the frequency of the master clocks CLKm is 27 MHz, for example, which is typically used as a reference frequency for video transfer. The time information (counter value) that is output from the clock unit 111 is supplied to the message sending unit 113 and the message receiving unit 114.

The message sending unit 113 sends a PTP (Precision Time Protocol) message to the slave device 120 via a transmission line 130 such as Ethernet (registered trademark). Here, in order to include the time information in the PTP message, it is necessary to convert the counter value serving as the time information to a value in a nanosecond (ns) unit. For this purpose, the message sending unit 113 is provided with a counter-value/ns converter 113a that performs conversion from the counter value to the value in a nanosecond (ns) unit. The message receiving unit 114 receives a PTP message that is sent from the slave device 120 via the transmission line 130.

The PTP message that the message sending unit 113 sends to the slave device 120 includes a Sync message, a FollowUp message, and a DelayResponse message. The Sync message is sent to initiate a time synchronization operation. The FollowUp message is sent to convey the time information of the master device 110 after the Sync message is sent. The DelayResponse message is sent as a response to a later-described DelayRequest message after the message receiving unit 114 receives the DelayRequest message from the slave device 120.

The slave device 120 includes a clock unit 121, a slave clock generator 122, a message receiving unit 123, a message sending unit 124, a calculation unit 125, and a correction unit 126. The slave device 120 further includes an estimate calculation unit 127, a frequency correction unit 128, and a D/A converter 129.

The clock unit 121 is configured by a counter that is counted up with slave clocks CLKs that are generated by the slave clock generator 122. In the case of a video system such as a camera system, the frequency of the slave clocks CLKs is 27 MHz, for example, similar to the frequency of the master clocks CLKm described above, which is typically used as a reference frequency for video transfer. The time information (counter value) that is output from the clock unit 121 is supplied to the message receiving unit 123 and the message sending unit 124.

The message receiving unit 123 receives the PTP message that is sent from the master device 110 via the transmission line 130. As described above, the time information contained in the PTP message that is sent from the master device 110 is information of a value in a nanosecond (ns) unit. For this purpose, the message receiving unit 123 is provided with an ns/counter-value converter 123a that performs conversion from the value in a nanosecond (ns) unit to the counter value. The message sending unit 124 sends a PTP message to the master device 110 via the transmission line 130.

The PTP message that the message sending unit 124 sends to the master device 110 includes a DelayRequest message. The DelayRequest message is sent to request the master device 110 to issue a DelayResponse message after the FollowUp message sent from the master device 110 is received by the message receiving unit 123. Moreover, the DelayRequest message is sent to request the master device 110 to issue a DelayResponse message after the time on the clock unit 121 is corrected by the correction unit 126.

The calculation unit 125 calculates a first value necessary for correcting the time on the clock unit 121. The calculation unit 125 constitutes a first calculation unit. The first value is an offset of the time St(x) on the clock unit 121 of the slave device 120 relative to the time Mt(x) on the clock unit 111 of the master device 110. Specifically, the calculation unit 125 calculates the offset by the equation (2) below. Moreover, the calculation unit 125 calculates a transmission delay component (Delay) between the master device 110 and the slave device 120 by the equation (3) below.

$$\text{Offset}=\{(t2-t1)-(t4-t3)\}/2 \qquad (2)$$

$$\text{Delay}=\{(t2-t1)+(t4-t3)\}/2 \qquad (3)$$

In the equation above, time t1 is the time represented by the time information of the FollowUp message that is received by the message receiving unit 123. This time t1 is the time at which the message sending unit 113 of the master device 120 sent (issued) the Sync message to the slave device 120. Moreover, time t2 is the time at which the Sync message is received by the message receiving unit 123. Furthermore, time t3 is the time, at which the message sending unit 124 sent (issued) the DelayRequest message to the master device 210, after the FollowUp message is received by the message receiving unit 123.

Furthermore, time t4 is the time represented by the time information of the DelayResponse message which is received by the message receiving unit 123 as a response to the DelayRequest message that the message sending unit 124 issued at time t3. This time t4 is the time at which the DelayRequest message that the message sending unit 124 issued at time t3 is received by the message receiving unit 114 of the master device 110.

Here, the time Mt(x) on the clock unit 111 of the master device 110 and the time St(x) on the clock unit 121 of the slave device 120 satisfy the following equation (4).

$$St(x)-Mt(x)=\text{Offset} \qquad (4)$$

When the equation (4) is modified, an equation (5) below is obtained.

$$St(x)=\text{Offset}+Mt(x) \qquad (5)$$

As is clear from the equations (4) and (5) and FIG. 2 described later, the time t2 can be expressed as an addition of Offset and Delay to the time t1. Therefore, (t2−t1) can be expressed as an addition of Offset and Delay as given in the following equation (6).

$$(t2-t1) = \text{Offset} + \text{Delay} \quad (6)$$

Moreover, as is clear from the equations (4) and (5) and FIG. 2 described later, the time t4 can be expressed as an addition of Delay to a subtraction of Offset from the time t3. Therefore, (t4−t3) can be expressed as an subtraction of Offset from Delay as given in the following equation (7).

$$(t4-t3) = \text{Delay} - \text{Offset} \quad (7)$$

As is clear from the equations (6) and (7), Offset can be calculated from the equation (2) and Delay from the equation (3).

The correction unit 126 corrects the time St(x) on the clock unit 121 based on the first value (Offset) calculated by the calculation unit 125. The correction unit 126 constitutes a first correction unit. Specifically, the correction unit 126 corrects the time St(x) on the clock unit 121 at the timings synchronized to the slave clocks CLKs generated from the slave clock generator 122 so that the time St(x) has a value subtracted by the first value (Offset).

In this case, the corrected time St(x)' on the clock unit 121 is in agreement with the time Mt(x) on the clock unit 111 of the master device 110, and time synchronization with the master device 110 is achieved. This is to say, this correction is expressed by the following equation (8).

$$St(x)' = St(x) - \text{Offset} \quad (8)$$

When the above-mentioned equation (5) is substituted into this equation (8), the following equation (9) is obtained.

$$St(x)' = (\text{Offset} + Mt(x)) - \text{Offset} \quad (9)$$
$$= Mt(x)$$

The estimate calculation unit 125 calculates a second value necessary for correcting the frequency of the slave clocks CLKs generated by the slave clock generator 122. Specifically, the estimate calculation unit 125 calculates the second value t6' by the following equation (10).

$$t6' = t5 + \text{Delay} \quad (10)$$

In the above equation, time t5 is the time at which the message sending unit 124 sent (issued) the DelayRequest message to the master device 210, after the time on the clock unit 121 is corrected by the correction unit 126, as described above. Moreover, Delay is the transmission delay component between the master device 110 and the slave device 120, calculated by the calculation unit 125 as described above (see the equation (3)). The second value t6' is an estimate of the time at which the DelayRequest message issued at time t5 is received by the message receiving unit 114 of the master device 110. The estimate calculation unit 127 and the above-described calculation unit 125 constitute a second calculation unit.

Moreover, the estimate calculation unit 127 outputs a correction command Fu for frequency increase or a correction command Fd for frequency decrease to the frequency correction unit 128. The estimate calculation unit 127 outputs the correction command Fu or the correction command Fd in accordance with a comparison result between the second value t6' and the time t6. Here, time t6 is the time represented by the time information of the DelayResponse message which is received by the message receiving unit 123 in response to the DelayRequest message that the message sending unit 124 issued at time t5. Moreover, this time t6 is the time at which the DelayRequest message that the message sending unit 124 issued at time t5 is received by the message receiving unit 114 of the master device 110.

The estimate calculation unit 127 outputs the correction command Fu for frequency increase by determining that the frequency of the slave clocks CLKs is low if t6>t6'. On the other hand, the estimate calculation unit 127 outputs the correction command Fd for frequency decrease by determining that the frequency of the slave clocks CLKs is high if t6<t6'.

The frequency correction unit 128 outputs a digital signal DS corresponding to a correction value VC that controls the frequency of the slave clocks CLKs generated by the slave clock generator 122. When the correction command Fu is output from the estimate calculation unit 127, the frequency correction unit 128 increases the value of the digital signal DS by a predetermined step. On the other hand, when the correction command Fd is output from the estimate calculation unit 127, the frequency correction unit 128 decreases the value of the digital signal DS by a predetermined step.

The D/A converter 129 converts the digital signal DS output from the frequency correction unit 128 to an analog correction value VC to be supplied to the slave clock generator 122. The slave clock generator 122 is configured, for example, by a voltage-variable crystal oscillator such as VCXO. The estimate calculation unit 127, the frequency correction unit 128, and the D/A converter 129 constitute a second correction unit.

Time Synchronization Operation

Figure 2:
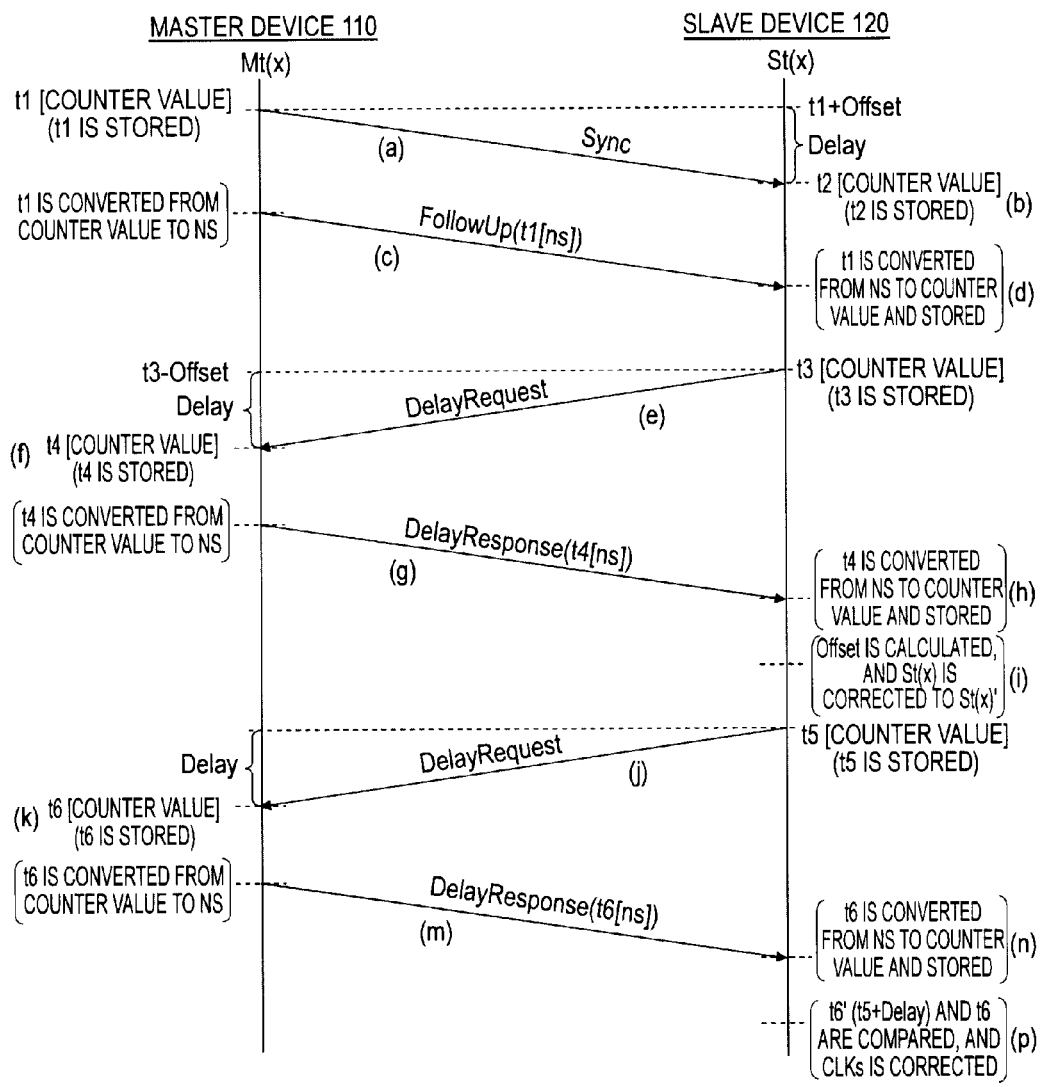
FIG. 2 is a sequence diagram illustrating a time synchronization operation performed in the electronic equipment system according to the first embodiment.

FIG. 2 illustrates a sequence diagram illustrating the time synchronization operation performed in the electronic equipment system 100 illustrated in FIG. 1.

(a) The time synchronization operation is initiated with the message sending unit 113 of the master device 110 sending a Sync message to the slave device 120. In this case, in the message sending unit 113, the issuance (sending) time t1 of the Sync message is stored in the form of the counter value which is the output of the clock unit 111.

(b) In the message receiving unit 123 of the slave device 120, the Sync message sent from the master device 110 is received, and the receipt time t2 of the Sync message is stored in the form of the counter value which is the output of the clock unit 121.

(c) Next, a FollowUp message is sent to the slave device 120 from the message sending unit 113 of the master device 110. The FollowUp message contains the time information representing the issuance time t1 of the Sync message as a value in a nanosecond (ns) unit. In this case, the counter value representing the time t1 is converted to the value in a nanosecond (ns) unit by the counter-value/ns converter 113a of the message sending unit 113.

(d) In the message receiving unit 123 of the slave device 120, the FollowUp message sent from the master device 110 is received, and a value in a nanosecond (ns) unit representing the time t1 is acquired. Moreover, this value is converted to the counter value, which is the output of the clock unit 121 and represents the time t1, by the ns/counter-value converter 123a and the counter value stored in the message receiving unit 123.

(e) Next, a DelayRequest message is sent to the master device 110 from the message sending unit 124 of the slave device 120. In this case, in the message sending unit 124, the issuance (sending) time t3 of the DelayRequest message is stored in the form of the counter value which is the output of the clock unit 121.

(f) In the message receiving unit 114 of the master device 110, the DelayRequest message sent from the slave device 120 is received, and the receipt time t4 of the DelayRequest message is stored in the form of the counter value which is the output of the clock unit 111.

(g) Next, a DelayResponse message is sent to the slave device 120 from the message sending unit 113 of the master device 110. The DelayResponse message contains the time information representing the time t4 when the DelayRequest message is received by the message receiving unit 114 as a value in a nanosecond (ns) unit. In this case, the counter value representing the time t4 is converted to a value in a nanosecond (ns) unit by the counter-value/ns converter 113*a* of the message sending unit 113.

(h) In the message receiving unit 123 of the slave device 120, the DelayResponse message sent from the master device 110 is received, and the value in a nanosecond (ns) unit representing the time t4 is acquired. Moreover, this value is converted to the counter value, which is the output of the clock unit 121 and represents the time t4, by the ns/counter-value converter 123*a*, and stored in the message receiving unit 123.

(i) In the calculation unit 125 of the slave device 120, Offset={(t4−t3)−(t2−t1)}/2 is calculated as a first value (see the equation (2)). In this case, the counter values, which are stored in the message receiving unit 123 and represent the times t1, t2, and t4, and the counter value which is stored in the message sending unit 124 and represents the time t3, are used. Moreover, the time St(x) on the clock unit 121 is corrected by the correction unit 126 so that the time St(x) has a value subtracted by the Offset (see the equation (8)). In this way, the corrected time St(x)' on the clock unit 121 is in agreement with the time Mt(x) on the clock unit 111 of the master device 110 (see the equation (9)).

(j) Next, a DelayRequest message is sent to the master device 110 from the message sending unit 124 of the slave device 120. In this case, in the message sending unit 124, the issuance (sending) time t5 of the DelayRequest message is stored in the form of the counter value which is the output of the clock unit 121.

(k) In the message receiving unit 114 of the master device 110, the DelayRequest message sent from the slave device 120 is received, and the receipt time t6 of the DelayRequest message is stored in the form of the counter value which is the output of the clock unit 111.

(m) Next, a DelayResponse message is sent to the slave device 120 from the message sending unit 113 of the master device 110. The DelayResponse message contains the time information representing the time t6 when the DelayRequest message is received by the message receiving unit 114 as a value in a nanosecond (ns) unit. In this case, the counter value representing the time t6 is converted to a value in a nanosecond (ns) unit by the counter-value/ns converter 113*a* of the message sending unit 113.

(n) In the message receiving unit 123 of the slave device 120, the DelayResponse message sent from the master device 110 is received, and the value in a nanosecond (ns) unit representing the time t6 is acquired. Moreover, this value is converted to the counter value, which is the output of the clock unit 121 and represents the time t6, by the ns/counter-value converter 123*a*, and stored in the message receiving unit 123.

(p) Next, in the calculation unit 125 of the slave device 120, Delay={(t4−t3)+(t2−t1)}/2 is calculated (see the equation (3)). In this case, the counter values, which are stored in the message receiving unit 123 and represent the times t1, t2, and t4, and the counter value which is stored in the message sending unit 124 and represents the time t3, are used. Moreover, in the estimate calculation unit 127, the Delay calculated by the calculation unit 125 is added to the counter value which is stored in the message sending unit 124 and represents the time t5, whereby an estimate t6'=t5+Delay is calculated (see the equation (10)).

In the estimate calculation unit 127, the time t6 stored in the message receiving unit 123 is compared with the estimate t'6, and a correction command corresponding to the comparison result is output. That is to say, if t6>t6', then the frequency of the slave clocks CLKs is determined to be low, and a correction command Fu for frequency increase is output. On the other hand, if t6<t6', then the frequency of the slave clocks CLKs is determined to be high, and a correction command Fd for frequency decrease is output.

In this way, in the frequency correction unit 128, the value of the output digital signal DS is changed based on the correction command output from the estimate calculation unit 127, and the control voltage VC supplied to the slave clock generator 122 is changed, whereby the frequency of the clocks CLKs is controlled. Therefore, a change in the counter values on the clock unit 121 can be matched to an ideal change in the counter values, conforming to the change in the counter values on the clock unit 121 of the master device 110.

Therefore, by repeating periodically the time synchronization operation illustrated in FIG. 2, the time on the slave device 120 can typically be made in agreement with the time on the master device 110 rather than only at the time of correcting the offset. Thus, the slave device 120 is able to achieve perfect time synchronization with the master device 110.

Figure 3:
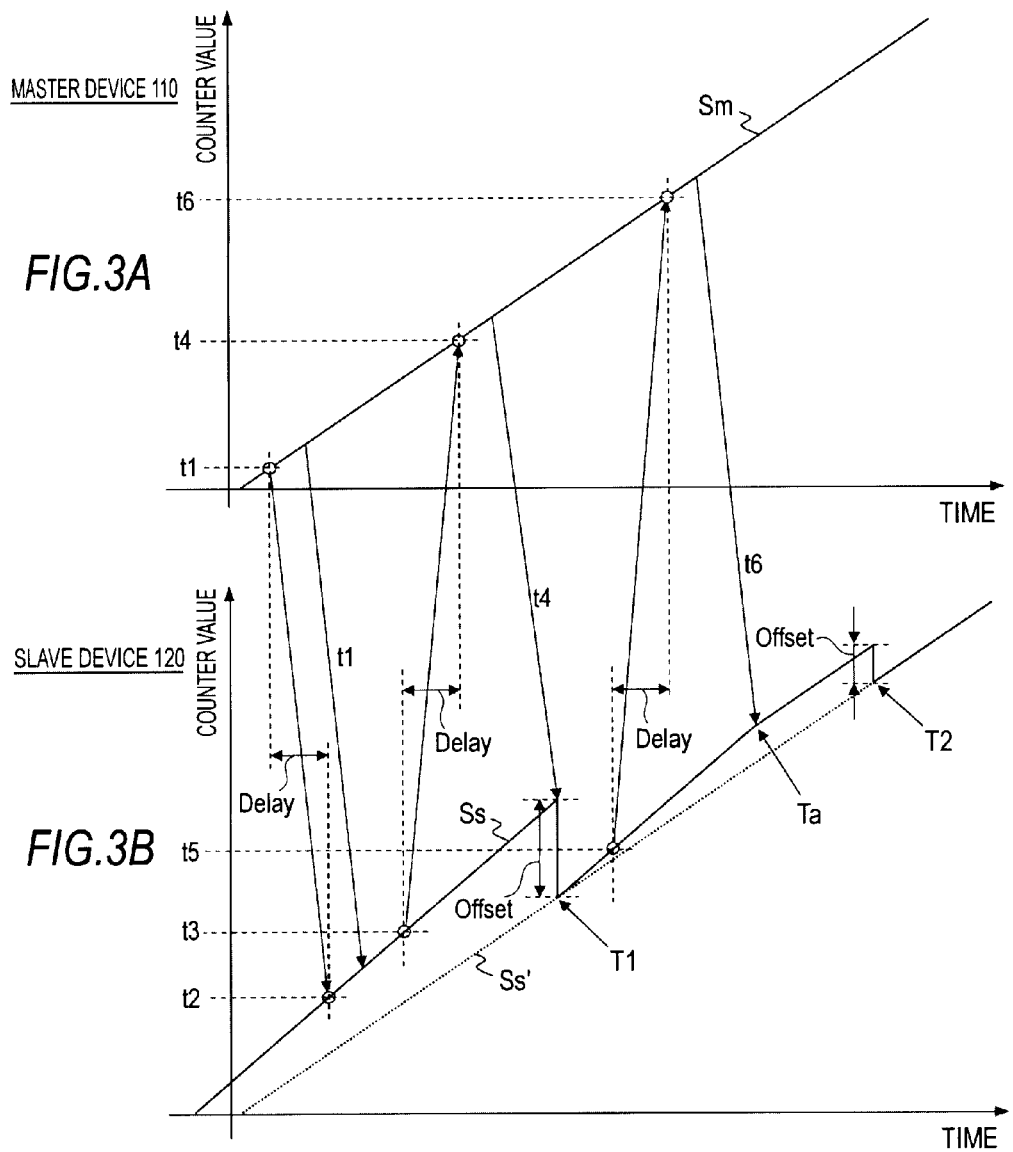
FIGS. 3A and 3B are diagrams graphically showing a change in counter values on a master device and a slave device during time synchronization.

FIGS. 3A and 3B graphically show a change in the counter values on the clock unit 111 of the master device 110 in the above-described time synchronization operation, together with a change in the counter values on the clock unit 121 of the slave device 120. The solid line Sm in FIG. 3A shows a change in the counter values on the clock unit 111 of the master device 110. The solid line Ss in FIG. 3B shows a change in the counter values on the clock unit 121 of the slave device 120. The broken line Ss' in FIG. 3B shows an ideal change in the counter values on the clock unit 121 of the slave device 120, conforming to the change in the counter values on the clock unit 111 of the master device 110.

As illustrated in FIG. 3B, the counter values on the clock unit 121 of the slave device 120 are correct counter values at the Offset correction time points T1, T2, and so on. However, at other time points where the change in the counter values does not follow the ideal change in the counter values, the counter values on the clock unit 121 of the slave device 120 deviate gradually from the ideal counter values with time.

However, at the time points Ta and the like where the frequency of the slave clocks CLKs is corrected, the change in the counter values on the clock unit 121 of the slave device 120 can be matched to the ideal change in the counter values. For this reason, by repeating periodically the time synchronization operation illustrated in FIG. 2, the counter values on the clock unit 121 of the slave device 120 can typically have correct values rather than only at the time of correcting the offset. Therefore, the time on the slave device 120 can typically be made in agreement with the time on the master device 110 rather than only at the time of correcting the offset. Thus, the slave device 120 is able to achieve perfect time synchronization with the master device 110.

As described above, in the electronic equipment system 100 illustrated in FIG. 1, the slave device 120 corrects the frequency of the clocks CLKs of the slave clock generator 122 based on the second value (estimate t6') in addition to the correction of the time on the clock unit 121 based on the first value (Offset).

That is to say, Offset is calculated as the first value by the calculation unit 125. Then, the time on the clock unit 121 is corrected by the correction unit 126 so that the time has a value subtracted by Offset. In this way, the clock unit 121 of the slave device 120 is made in agreement with the time on the clock unit 111 of the master device 110.

Moreover, the estimate t6' is calculated as the second value by the estimate calculation unit 127. This estimate t6' is the result of an addition of the transmission delay components (Delay) between the master device 110 and the slave device 120 at time t5 and is an estimate of the time at which the DelayRequest message issued at time t5 is received by the master device 110. When the estimate t6' is smaller than an actual receipt time t6, the frequency of the clocks CLKs for counting up the counter of the clock unit 121 is increased. On the other hand, the estimate t6' is larger than the actual receipt time t6, the frequency of the clocks CLKs is decreased. In this way, a change in the counter values on the counter of the clock unit 121 can be matched to an ideal change in the counter values conforming to a change in the counter value on the counter of the clock unit 111 of the master device 110.

Therefore, by repeating the correction of the time and the correction of the clock frequency, the time on the slave device 120 can typically be made in agreement with the time on the master device 110 rather than only at the time of correcting the offset. Thus, the slave device 120 is able to achieve perfect time synchronization with the master device 110.

2. Second Embodiment

Exemplary Configuration of Electronic Equipment System

Figure 4:
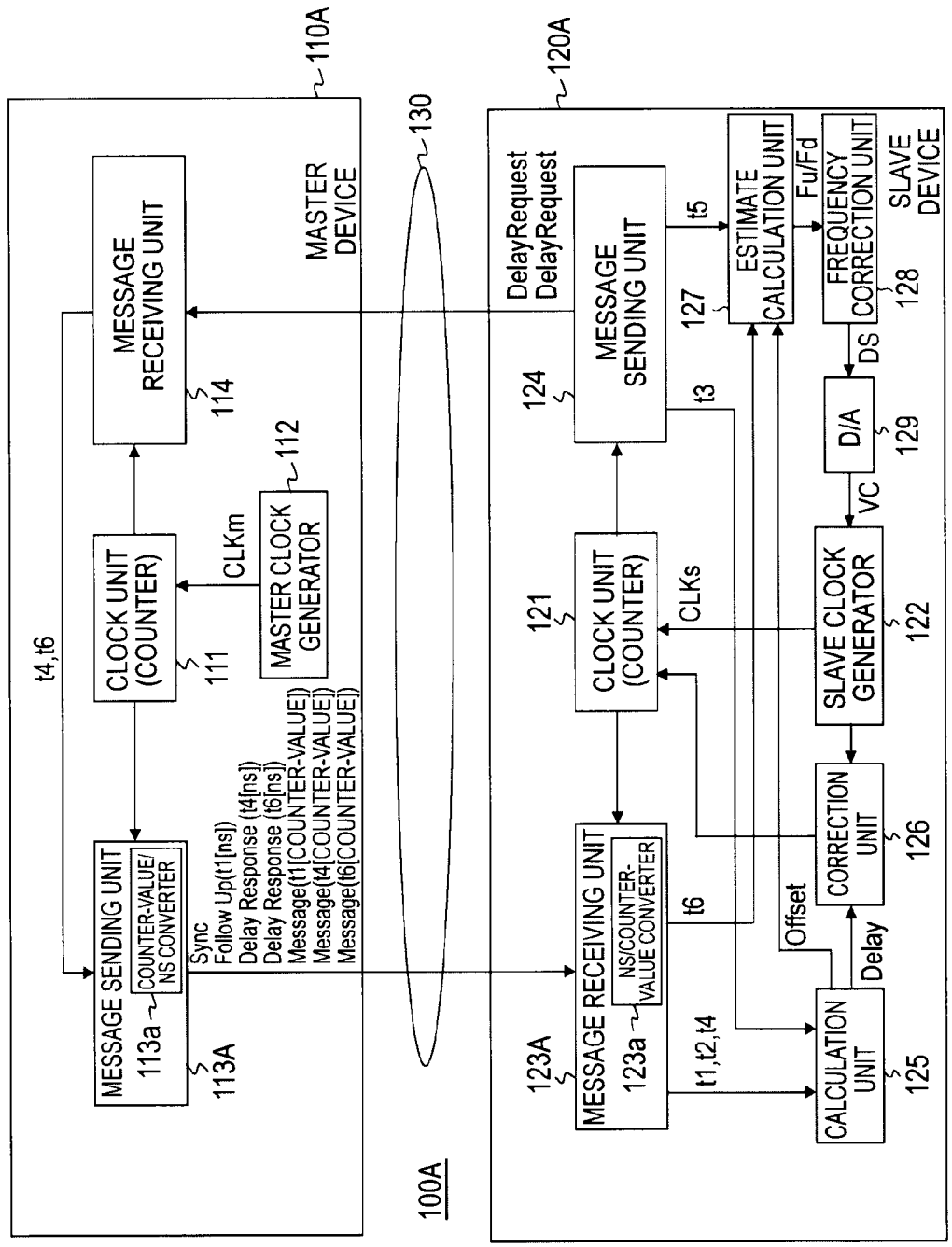
FIG. 4 is a schematic block diagram illustrating an exemplary configuration of an electronic equipment system according to a second embodiment of the present invention.

FIG. 4 illustrates an exemplary configuration of an electronic equipment system 100A according to the second embodiment. The electronic equipment system 100A includes a master device 110A and a slave device 120B similarly to the electronic equipment system 100 illustrated in FIG. 1. In FIG. 4, portions corresponding to those in FIG. 1 will be denoted by the same reference numerals, and description thereof will be omitted.

The master device 110A includes a clock unit 111, a master clock generator 112, a message sending unit 113A, and a message receiving unit 114.

The message sending unit 113A sends a PTP (Precision Time Protocol) message to the slave device 120 via a transmission line 130. The PTP message that the message sending unit 113A sends to the slave device 120 includes a Message message in addition to the above-described Sync message, FollowUp message, and DelayResponse message.

The message sending unit 113A sends the Message message subsequent to the FollowUp message to the slave device 120. As described above, the FollowUp message contains the time information representing the time t1, at which the Sync message is issued (sent), as a value in a nanosecond (ns) unit. The Message message subsequent to the FollowUp message also contains the time information representing the time t1, but the time information is in the form of a counter value representing the time t1.

Moreover, the message sending unit 113A sends a Message message subsequent to the DelayResponse message to the slave device 120. As described above, the DelayResponse message contains the time information representing the times t4 and t6 when the DelayRequest message is received by the message receiving unit 114 as a value in a nanosecond (ns) unit. The Message message subsequent to the DelayResponse message also contains the time information representing the times t4 and t6, but the time information is in the form of counter values representing the times t4 and t6.

Other configurations of the master device 110A are the same as those of the master device 110 of the electronic equipment system 100 illustrated in FIG. 1.

The slave device 120A includes a clock unit 121, a slave clock generator 122, a message receiving unit 123A, a message sending unit 124, a calculation unit 125, and a correction unit 126. Moreover, the slave device 120A further includes an estimate calculation unit 127, a frequency correction unit 128, and a D/A converter 129.

The frequency of the slave clocks CLKs generated by the slave clock generator 122 is the same as the frequency of the master clocks CLKm generated by the master clock generator 112 of the master device 110A described above. For example, in the case of a video system such as a camera system, the frequencies of both clocks CLKm and CLKs are 27 MHz, for example, which is typically used as a reference frequency for video transfer.

The message receiving unit 123A receives the PTP message that is sent from the master device 110A via the transmission line 130. As described above, the Message message is sent, subsequently to the FollowUp message, from the message sending unit 113A of the master device 110A. The message receiving unit 123A receives the FollowUp message and the Message message which is sent subsequently thereto.

The FollowUp message contains the value in a nanosecond (ns) unit as the time information representing the time t1. On the other hand, the Message message contains the counter value as the time information representing the time t1. In this embodiment, the message receiving unit 123A acquires and stores the counter value which is contained in the Message message and represents the time t1. The calculation unit 125 uses this time t1 [counter value] when calculating Offset (see the equation (2)) and Delay (see the equation (3))

Moreover, as described above, the Message message is sent, subsequently to the DelayResponse message, from the message sending unit 113A of the master device 110A. The message receiving unit 123A receives the DelayResponse message and the Message message which is sent subsequently thereto.

The DelayResponse message contains the value in a nanosecond (ns) unit as the time information representing the times t4 and t6. On the other hand, the Message message contains the counter value as the time information representing the times t4 and t6. In this embodiment, the message receiving unit 123A acquires and stores the counter values which are contained in the Message message and represent the times t4 and t6.

The calculation unit 125 uses this time t4 [counter value] when calculating Offset (see the equation (2)) and Delay (see the equation (3)). Moreover, the estimate calculation unit 127 uses this time t6 [counter value] as an actual receipt time for comparison with the estimate t6'.

Other configurations of the slave device 120A are the same as those of the slave device 120 of the electronic equipment system 100 illustrated in FIG. 1.

Time Synchronization Operation

Figure 5:
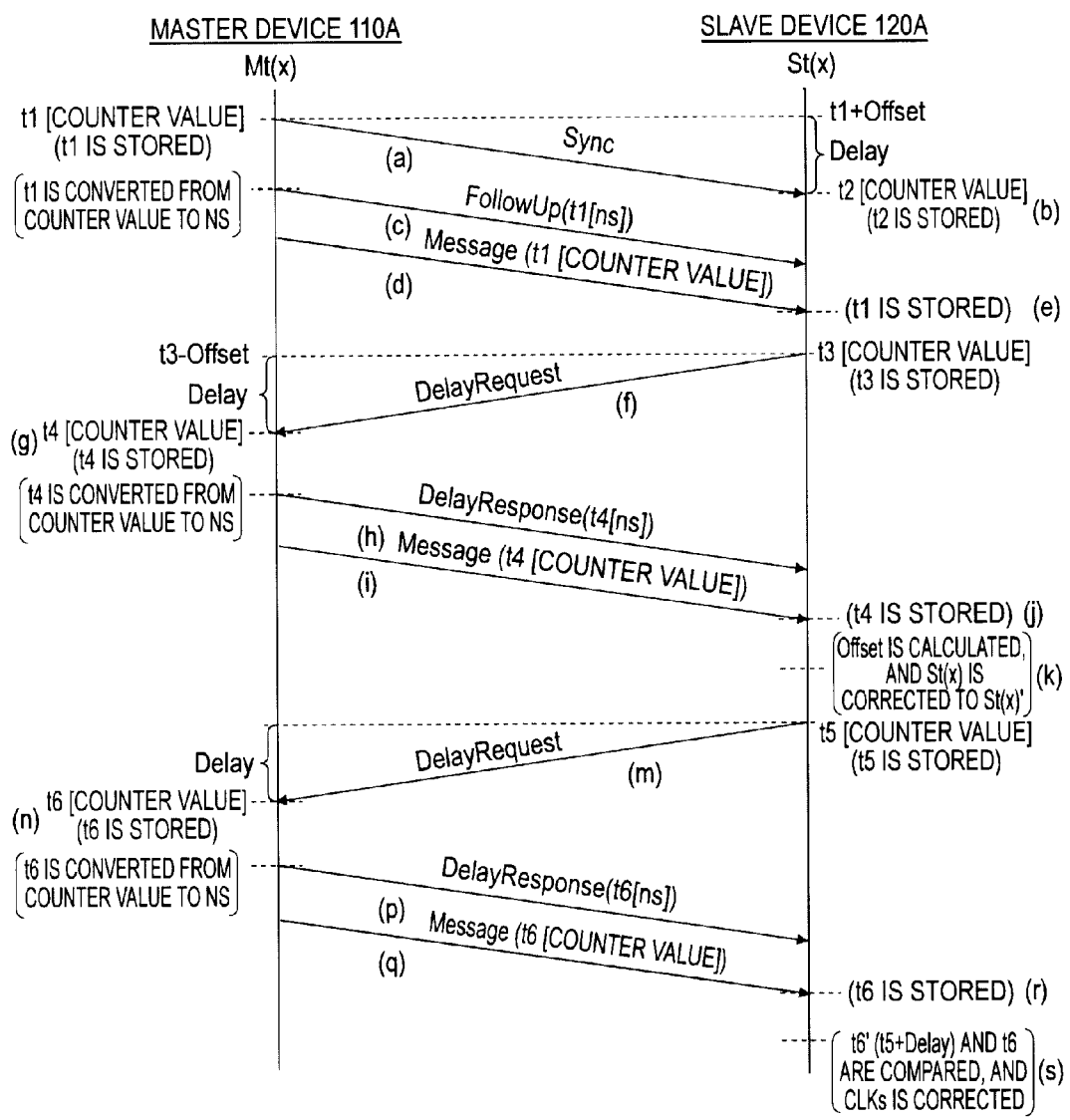
FIG. 5 is a sequence diagram illustrating a time synchronization operation performed in the electronic equipment system according to the second embodiment.

FIG. 5 illustrates a sequence diagram illustrating the time synchronization operation performed in the electronic equipment system 100A illustrated in FIG. 4.

(a) The time synchronization operation is initiated with the message sending unit 113A of the master device 110A sending a Sync message to the slave device 120A. In this case, in the message sending unit 113A, the issuance (sending) time t1 of the Sync message is stored in the form of the counter value which is the output of the clock unit 111.

(b) In the message receiving unit 123A of the slave device 120A, the Sync message sent from the master device 110A is received, and the receipt time t2 of the Sync message is stored in the form of the counter value which is the output of the clock unit 121.

(c) Next, a FollowUp message is sent to the slave device 120A from the message sending unit 113A of the master device 110A. The FollowUp message contains the time information representing the issuance time t1 of the Sync message as a value in a nanosecond (ns) unit. In this case, the counter value representing the time t1 is converted to the value in a nanosecond (ns) unit by the counter-value/ns converter 113a of the message sending unit 113A.

In the message receiving unit 123A of the slave device 120A, the FollowUp message sent from the master device 110A is received. However, in the message receiving unit 123A of this embodiment, the operation of acquiring the value in nanosecond (ns) unit representing the time t1, converting the value to the counter value, and storing the counter value is not performed.

(d) Next, a Message message is sent to the slave device 120A from the message sending unit 113A of the master device 110A. The Message message contains the time information representing the issuance time t1 of the Sync message as the counter value.

(e) In the message receiving unit 123A of the slave device 120A, the Message message sent from the master device 110A is received, and the counter value representing the time t1 is acquired and stored as it was.

(f) Next, a DelayRequest message is sent to the master device 110A from the message sending unit 124 of the slave device 120A. In this case, in the message sending unit 124, the issuance (sending) time t3 of the DelayRequest message is stored in the form of the counter value which is the output of the clock unit 121.

(g) In the message receiving unit 114 of the master device 110A, the DelayRequest message sent from the slave device 120A is received, and the receipt time t4 of the DelayRequest message is stored in the form of the counter value which is the output of the clock unit 111.

(h) Next, a DelayResponse message is sent to the slave device 120A from the message sending unit 113A of the master device 110A. The DelayResponse message contains the time information representing the time t4 when the DelayRequest message is received by the message receiving unit 114 as a value in a nanosecond (ns) unit. In this case, the counter value representing the time t4 is converted to a value in a nanosecond (ns) unit by the counter-value/ns converter 113a of the message sending unit 113A.

In the message receiving unit 123A of the slave device 120A, the DelayResponse message sent from the master device 110A is received. However, in the message receiving unit 123A of this embodiment, the operation of acquiring the value in nanosecond (ns) unit representing the time t4, converting the value to the counter value, and storing the counter value is not performed.

(i) Next, a Message message is sent to the slave device 120A from the message sending unit 113A of the master device 110A. The Message message contains the time information representing the time t4, at which the DelayRequest message is received by the message receiving unit 114, as the counter value.

(j) In the message receiving unit 123A of the slave device 120A, the Message message sent from the master device 110A is received, and the counter value representing the time t4 is acquired and stored as it was.

(k) Next, in the calculation unit 125 of the slave device 120A, Offset=$\{(t4-t3)-(t2-t1)\}/2$ is calculated as a first value (see the equation (2)). In this case, the counter values which are stored in the message receiving unit 123A and represent the times t1, t2, and t4, and the counter value, which is stored in the message sending unit 124 and represents the time t3, are used. Moreover, the time $St(x)$ on the clock unit 121 is corrected by the correction unit 126 so that the time $St(x)$ has a value subtracted by Offset (see the equation (8)). In this way, the corrected time $St(x)'$ on the clock unit 121 is in agreement with the time $Mt(x)$ on the clock unit 111 of the master device 110A (see the equation (9)).

(m) Next, a DelayRequest message is sent to the master device 110A from the message sending unit 124 of the slave device 120A. In this case, in the message sending unit 124, the issuance (sending) time t5 of the DelayRequest message is stored in the form of the counter value which is the output of the clock unit 121.

(n) In the message receiving unit 114 of the master device 110A, the DelayRequest message sent from the slave device 120A is received, and the receipt time t6 of the DelayRequest message is stored in the form of the counter value which is the output of the clock unit 111.

(p) Next, a DelayResponse message is sent to the slave device 120A from the message sending unit 113A of the master device 110A. The DelayResponse message contains the time information representing the time t6 when the DelayRequest message is received by the message receiving unit 114 as a value in a nanosecond (ns) unit. In this case, the counter value representing the time t6 is converted to a value in a nanosecond (ns) unit by the counter-value/ns converter 113a of the message sending unit 113A.

In the message receiving unit 123A of the slave device 120A, the Delay Response message sent from the master device 110A is received. However, in the message receiving unit 123A of this embodiment, the operation of acquiring the value in nanosecond (ns) unit representing the time t6, converting the value to the counter value, and storing the counter value is not performed.

(q) Next, a Message message is sent to the slave device 120A from the message sending unit 113A of the master device 110A. The Message message contains the time information representing the time t6, at which the DelayRequest message is received by the message receiving unit 114, as the counter value.

(r) In the message receiving unit 123A of the slave device 120A, the Message message sent from the master device 110A is received, and the counter value representing the time t6 is acquired and stored as it was.

(s) Next, in the calculation unit 125 of the slave device 120A, Delay=$\{(t4-t3)+(t2-t1)\}/2$ is calculated (see the equation (3)). In this case, the counter values which are stored in the message receiving unit 123A and represent the times t1, t2, and t4, and the counter value, which is stored in the message sending unit 124 and represents the time t3, are used. Moreover, in the estimate calculation unit 127, the Delay calculated by the calculation unit 125 is added to the counter value which is stored in the message sending unit 124 and represents the time t5, whereby an estimate t6'=t5+Delay is calculated.

In the estimate calculation unit 127, the time t6 stored in the message receiving unit 123 is compared with the estimate t'6, and a correction command corresponding to the comparison result is output. That is to say, if t6>t6', then the frequency of the slave clocks CLKs is determined to be low, and a correction command Fu for frequency increase is output. On the other hand, if t6<t6', then the frequency of the slave device CLKs is determined to be high, and a correction command Fd for frequency decrease is output.

In this way, in the frequency correction unit 128, the value of the output digital signal DS is changed based on the correction command output from the estimate calculation unit 127, and the control voltage VC supplied to the slave clock generator 122 is changed, whereby the frequency of the clocks CLKs is controlled. Therefore, a change in the counter values on the clock unit 121 can be matched to an ideal change in the counter values, conforming to the change in the counter values on the clock unit 121 of the master device 110A.

Therefore, by repeating periodically the time synchronization operation illustrated in FIG. 5, the time on the slave device 120A can typically be made in agreement with the time on the master device 110A rather than only at the time of correcting the offset. Thus, the slave device 120A is able to achieve perfect time synchronization with the master device 110A.

As described above, in the electronic equipment system 100A illustrated in FIG. 4, the same time synchronization operation as that in the electronic equipment system 100 illustrated in FIG. 1 is performed. In this case, the slave device 120A corrects the frequency of the clocks CLKs of the slave clock generator 122 based on the estimate t6' serving as the second value in addition to the correction of the time on the clock unit 121 based on Offset serving as the first value. Therefore, by repeating the correction of the time and the correction of the clock frequency, the time on the slave device 120A can typically be made in agreement with the time on the master device 110A rather than only at the time of correcting the offset. Thus, the slave device 120A is able to achieve perfect time synchronization with the master device 110A.

Moreover, in the electronic equipment system 100A illustrated in FIG. 4, the Message message is sent from the master device 110A to the slave device 120A, in which the time information of the times t1, t4, and t6 is conveyed in the form of the counter value. In this manner, by sending the time information from the master device 110A to the slave device 120A in the form of the counter value, it is not necessary to perform the operation where the master device converts the counter value to the value in a nanosecond (ns) unit, and the operation where the slave device converts the value in a nanosecond (ns) unit to the counter value. For this reason, the time information of the times t1, t4, and t6 supplied from the master device 110A to the slave device 120A will be accurate time information containing no calculation errors during the conversion. Therefore, the calculation unit 125 is able to calculate the Offset and Delay with high precision. Moreover, the estimate calculation unit 127 is able to calculate the estimate t6'=t5+Delay with high precision and compare the estimate t6' and the actual receipt time t6 with high precision. Accordingly, the slave device 120A is able to achieve time synchronization with the master device 110A with higher precision.

3. Third Embodiment

Exemplary Configuration of Electronic Equipment System

Figure 6:
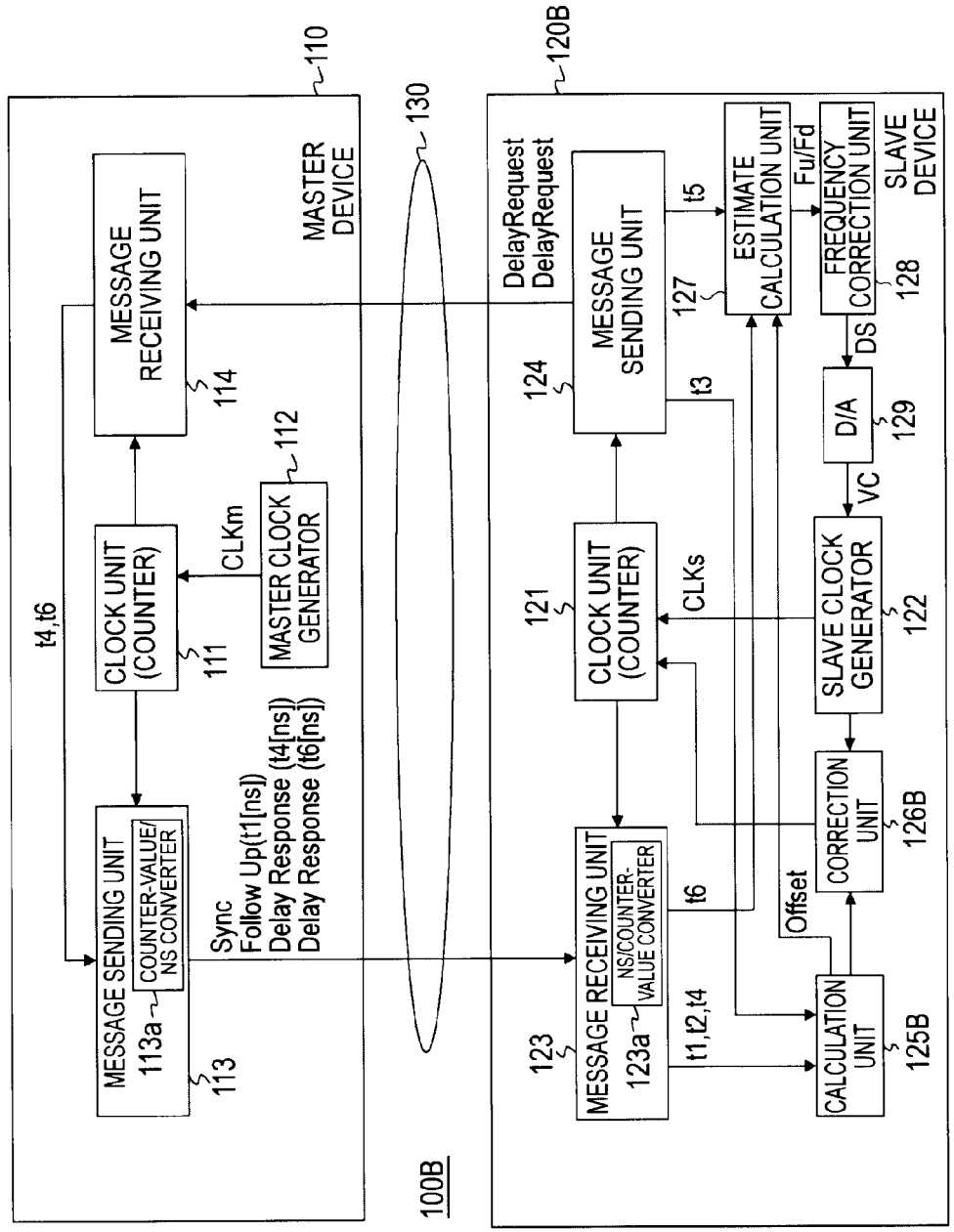
FIG. 6 is a schematic block diagram illustrating an exemplary configuration of an electronic equipment system according to a third embodiment of the present invention.

FIG. 6 illustrates an exemplary configuration of an electronic equipment system 100B according to the third embodiment. The electronic equipment system 100B includes a master device 110 and a slave device 120B similarly to the electronic equipment system 100 illustrated in FIG. 1. In FIG. 6, portions corresponding to those in FIG. 1 will be denoted by the same reference numerals, and description thereof will be omitted.

The slave device 120B includes a clock unit 121, a slave clock generator 122, a message receiving unit 123, a message sending unit 124, a calculation unit 125B, and a correction unit 126B. The slave device 120B further includes an estimate calculation unit 127, a frequency correction unit 128, and a D/A converter 129.

The calculation unit 125B calculates a correction value (first value) necessary for correcting the time on the clock unit 121. Specifically, the correction value includes a first correction value used in a first stage of correction and a second correction value used in a second stage of correction. The calculation unit 125B calculates (t2−t1) as the first correction value. Here, time t1 is the time represented by the time information of the FollowUp message that is received by the message receiving unit 123. This time t1 is the time at which the message sending unit 113 of the master device 110 sent (issued) the Sync message to the slave device 120B. Moreover, time t2 is the time at which the Sync message is received by the message receiving unit 123.

Moreover, the calculation unit 125B calculates (t4−t3)/2 as the second correction value. Here, time t3 is the time at which the message sending unit 124 sent (issued) the DelayRequest message to the master device 110. Moreover, time t4 is the time represented by the time information of the DelayResponse message that is received by the message receiving unit 123. This time t4 is the time at which the DelayRequest message that the message sending unit 124 issued at time t3 is received by the message receiving unit 114 of the master device 110.

The correction unit 126B performs a first stage of correction and a second stage of correction. That is to say, in the first stage of correction, the correction unit 126B corrects the time St(x) on the clock unit 121 based on the first correction value calculated by the calculation unit 125B. In this case, the correction unit 126B corrects the time St(x) on the clock unit 121 at the timings synchronized to the slave clocks CLKs generated from the slave clock generator 122 so that the time St(x) has a value subtracted by the first correction value "(t2−t1)".

In this case, the corrected time St(x)' on the clock unit 121 has a value corresponding to a subtraction of a transmission delay component (Delay) between the master device 110 and the slave device 120B from the time Mt(x) on the clock unit 111 of the master device 110. Thus, the corrected time St(x)' is in a state such that an offset component (Offset) is excluded.

That is to say, if it is assumed that a difference between the time St(x) on the clock unit 121 of the slave device 120B, which is not corrected, and the time Mt(x) on the clock unit 111 of the master device 110 is Offset, then, the following equation (11) is satisfied.

$$St(x)-Mt(x)=\text{Offset} \quad (11)$$

When the equation (11) is modified, an equation (12) below is obtained.

$$St(x)=\text{Offset}+Mt(x) \quad (12)$$

If it is assumed that a transmission delay between the master device 110 and the slave device 120B is Delay, then the first correction value (t2−t1) can be expressed as an addition of Offset and Delay as given in the following equation (13).

$$(t2-t1)=\text{Offset}+\text{Delay} \quad (13)$$

The first stage of correction can be expressed by the following equation (14).

$$St(x)'=St(x)-(t2-t1) \quad (14)$$

When the above-mentioned equations (12) and (13) are substituted into this equation (14), the following equation (15) is obtained.

$$St(x)' = (\text{Offset} + Mt(x)) - (\text{Offset} + \text{Delay}) \quad (15)$$
$$= Mt(x) - \text{Delay}$$

In this way, the corrected time $St(x)'$ obtained in the first stage of correction has a value corresponding to a subtraction of a transmission delay component (Delay) between the master device 110 and the slave device 120B from the time $Mt(x)$ on the clock unit 111 of the master device 110. Thus, the corrected time $St(x)'$ is in a state such that an offset component (Offset) is excluded.

Moreover, in the second stage of correction, the correction unit 126B corrects the corrected time $St(x)'$ on the clock unit 121 based on the second correction value calculated by the calculation unit 125B. In this case, the correction unit 126B corrects the corrected time $St(x)'$ on the clock unit 121 at the timings synchronized to the slave clocks CLKs generated from the slave clock generator 122 so that the corrected time $St(x)'$ has a value added by the second correction value "(t4−t3)/2".

In this case, the corrected time $St(x)''$ on the clock unit 121 is in agreement with the time $Mt(x)$ on the clock unit 111 of the master device 110, and time synchronization with the master device 110 is achieved.

That is to say, from the above-mentioned equation (15), t4 is (Mt(x)+Delay) when t3 is (Mt(x)−Delay). Therefore, (t4−t3)/2 is the Delay as given in the following equation (16).

$$(t4 - t3)/2 = \{(Mt(x) + \text{Delay}) - (Mt(x) - \text{Delay})\}/2 \quad (16)$$
$$= 2*\text{Delay}/2$$
$$= \text{Delay}$$

The second stage of correction can be expressed by the following equation (17).

$$St(x)''=St(x)'+(t4-t3)/2 \quad (17)$$

When the above-mentioned equations (15) and (16) are substituted into this equation (17), the following equation (18) is obtained.

$$St(x)'' = (Mt(x) - \text{Delay}) + \text{Delay} \quad (18)$$
$$= Mt(x)$$

In this way, the corrected time $St(x)''$ obtained in the second stage of correction is in agreement with the time $Mt(x)$ on the clock unit 111 of the master device 110, and time synchronization with the master device 110 is achieved.

Other configurations of the slave device 120B are the same as those of the slave device 120 of the electronic equipment system 100 illustrated in FIG. 1.

Time Synchronization Operation

Figure 7:
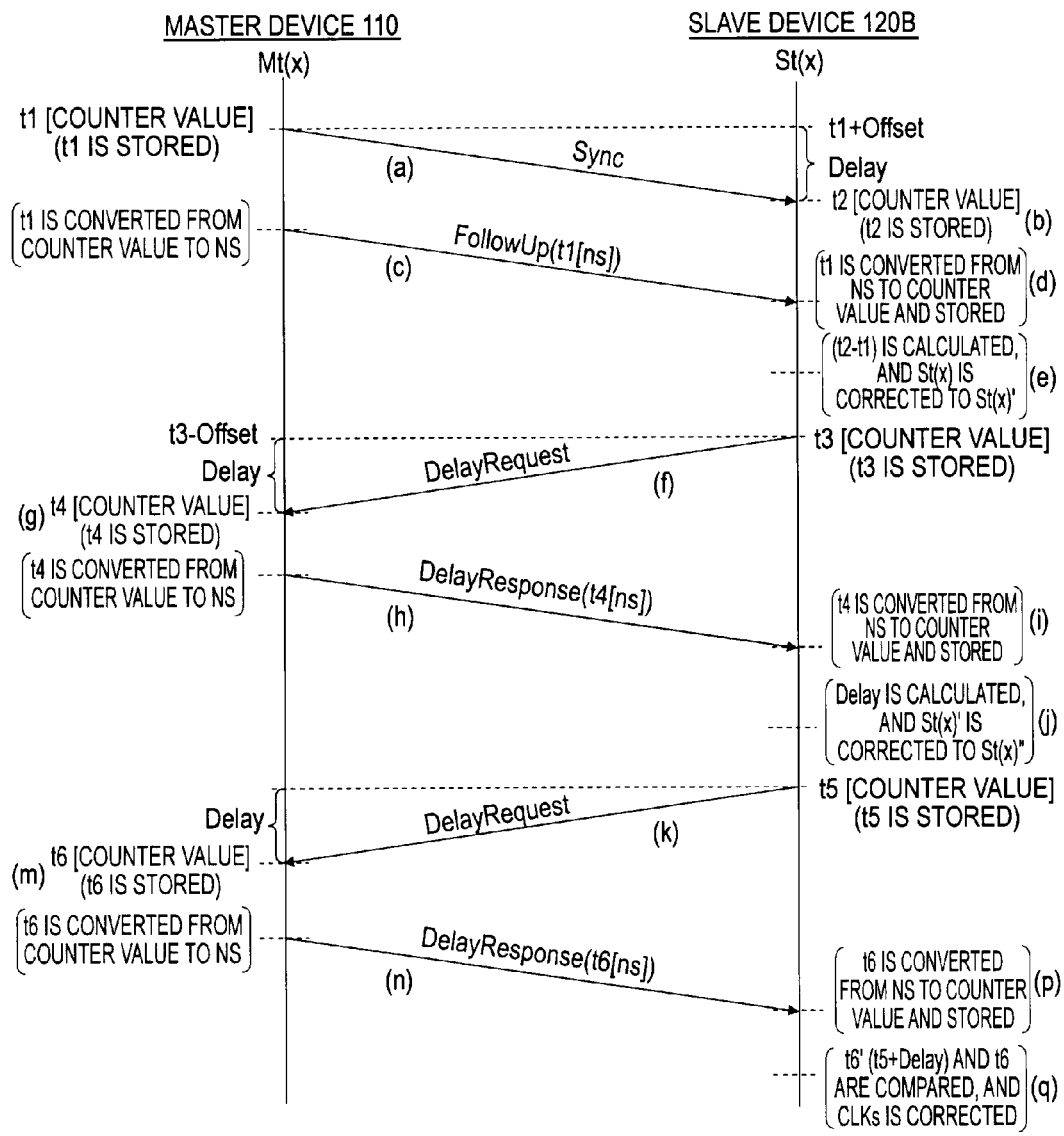
FIG. 7 is a sequence diagram illustrating a time synchronization operation performed in the electronic equipment system according to the third embodiment.
Figure 8:
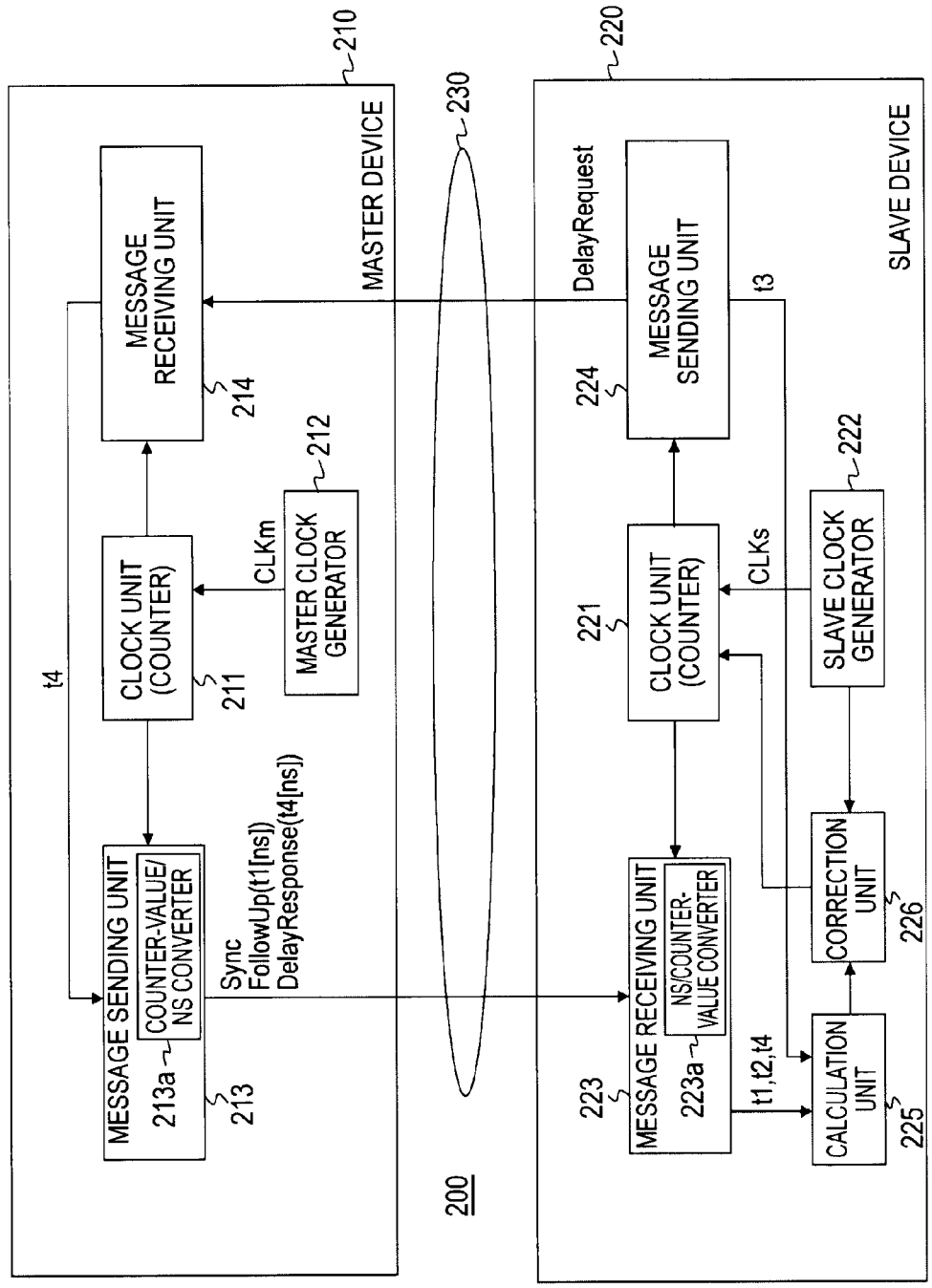
FIG. 8 is a schematic block diagram illustrating an exemplary configuration of an electronic equipment system in which time synchronization is achieved using the IEEE 1588 protocol.
Figure 9:
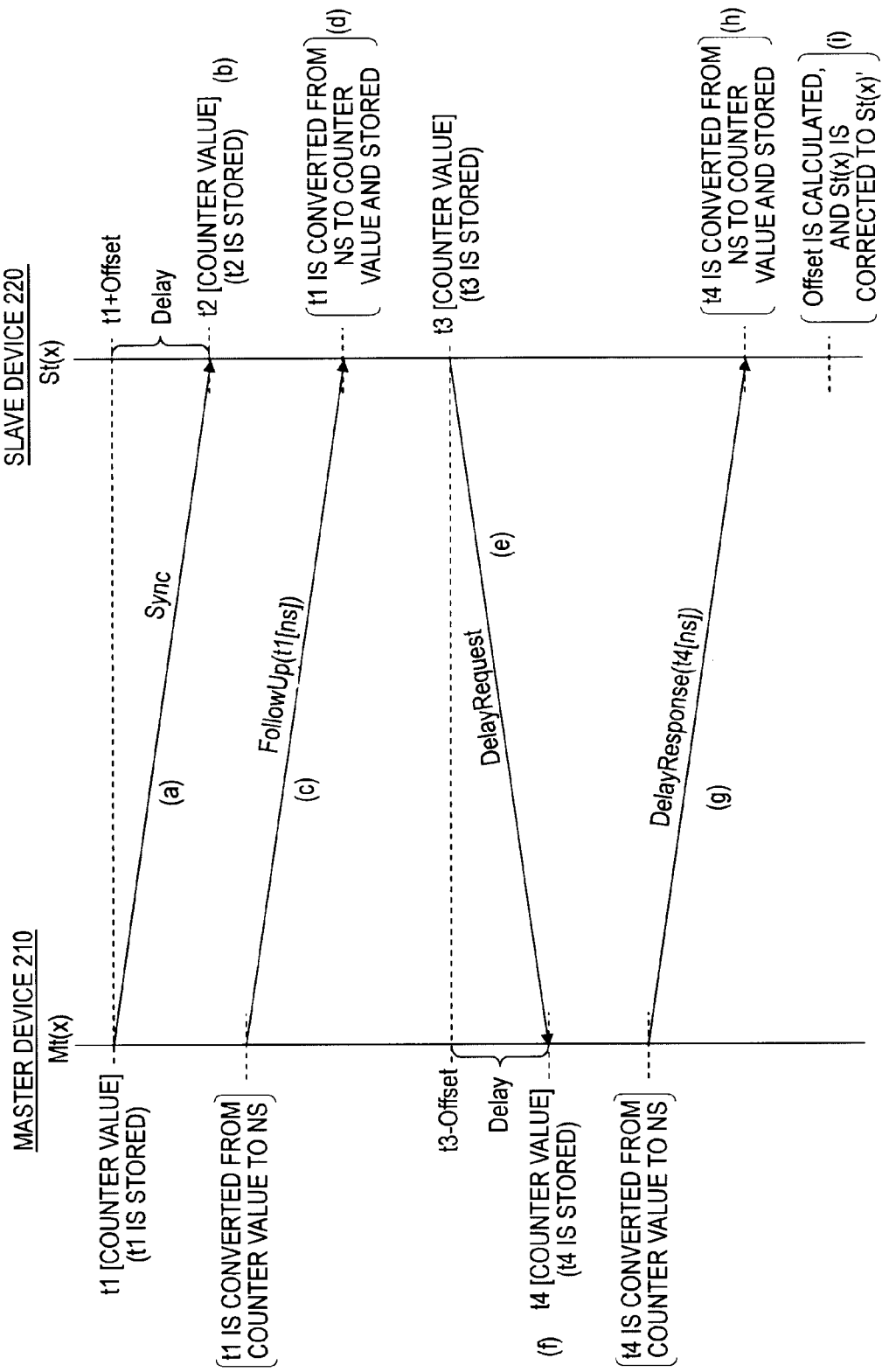
FIG. 9 is a sequence diagram illustrating a time synchronization operation which is performed in the electronic equipment system using the IEEE 1588 protocol.
Figures 10A, 10B:
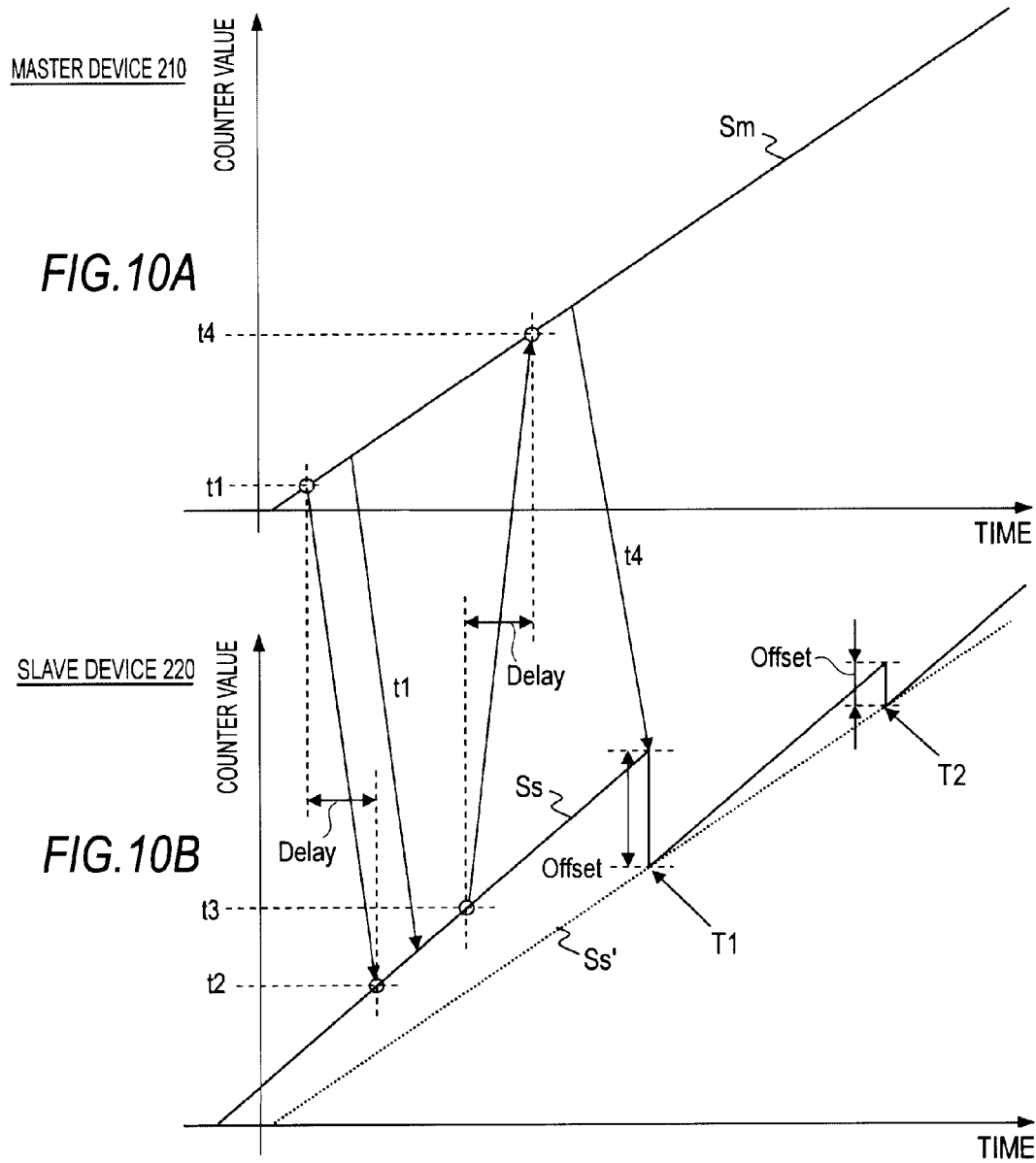
FIGS. 10A and 10B are diagrams graphically showing a change in counter values on a master device and a slave device during time synchronization.

FIG. 7 illustrates a sequence diagram illustrating the time synchronization operation performed in the electronic equipment system 100B illustrated in FIG. 6.

(a) The time synchronization operation is initiated with the message sending unit 113 of the master device 110 sending a Sync message to the slave device 120B. In this case, in the message sending unit 113, the issuance (sending) time t1 of the Sync message is stored in the form of the counter value which is the output of the clock unit 111.

(b) In the message receiving unit 123 of the slave device 120B, the Sync message sent from the master device 110 is received, and the receipt time t2 of the Sync message is stored in the form of the counter value which is the output of the clock unit 121.

(c) Next, a FollowUp message is sent to the slave device 120B from the message sending unit 113 of the master device 110. The FollowUp message contains the time information representing the issuance time t1 of the Sync message as a value in a nanosecond (ns) unit. In this case, the counter value representing the time t1 is converted to the value in a nanosecond (ns) unit by the counter-value/ns converter 113a of the message sending unit 113.

(d) In the message receiving unit 123 of the slave device 120B, the FollowUp message sent from the master device 110 is received, and a value in a nanosecond (ns) unit representing the time t1 is acquired. Moreover, this value is converted to the counter value, which is the output of the clock unit 121 and represents the time t1, by the ns/counter-value converter 123a and the counter value stored in the message receiving unit 123.

(e) Next, in the calculation unit 125B of the slave device 120B, (t2−t1) serving as a first correction value is calculated using the counter values which are stored in the message receiving unit 123 and represent the times t1 and t2. Then, the time $St(x)$ on the clock unit 121 is corrected by the correction unit 126B so that the time $St(x)$ has a value subtracted by the first correction value "(t2−t1)" (see the equation (14)). The corrected time $St(x)'$ on the clock unit 121 has a value corresponding to a subtraction of a transfer delay component (Delay) between the master device 110 and the slave device 120B from the time $Mt(x)$ on the clock unit 111 of the master device 110. Thus, the corrected time $St(x)'$ is in a state such that an offset component (Offset) is excluded (see the equation (15)).

(f) Next, a DelayRequest message is sent to the master device 110 from the message sending unit 124 of the slave device 120B. In this case, in the message sending unit 124, the issuance (sending) time t3 of the DelayRequest message is stored in the form of the counter value which is the output of the clock unit 121.

(g) In the message receiving unit 114 of the master device 110, the DelayRequest message sent from the slave device 120B is received, and the receipt time t4 of the DelayRequest message is stored in the form of the counter value which is the output of the clock unit 111.

(h) Next, a DelayResponse message is sent to the slave device 120B from the message sending unit 113 of the master device 110. The DelayResponse message contains the time information representing the time t4 when the DelayRequest message is received by the message receiving unit 114 as a value in a nanosecond (ns) unit. In this case, the counter value representing the time t4 is converted to a value in a nanosecond (ns) unit by the counter-value/ns converter 113a of the message sending unit 113.

(i) In the message receiving unit 123 of the slave device 120B, the DelayResponse message sent from the master device 110 is received, and the value in a nanosecond (ns) unit representing the time t4 is acquired. Moreover, this value is converted to the counter value, which is the output of the clock unit 121 and represents the time t4, by the ns/counter-value converter 123a, and stored in the message receiving unit 123.

(j) Next, in the calculation unit 125B of the slave device 120B, a second correction value "(t4−t3)/2" is calculated using the counter value, which is stored in the message receiving unit 123 and represents the time t4, and the counter value which is stored in the message sending unit 124 and represents the time t3. Moreover, the corrected time St(x)' on the clock unit 121 is corrected by the correction unit 126B so that the corrected time St(x)' has a value subtracted by the second correction value "(t4−t3)/2" (see the equation (17)). In this way, the corrected time St(x)" on the clock unit 121 is in agreement with the time Mt(x) on the clock unit 111 of the master device 110 (see the equation (18)).

(k) Next, a DelayRequest message is sent to the master device 110 from the message sending unit 124 of the slave device 120B. In this case, in the message sending unit 124, the issuance (sending) time t5 of the DelayRequest message is stored in the form of the counter value which is the output of the clock unit 121.

(m) In the message receiving unit 114 of the master device 110, the DelayRequest message sent from the slave device 120B is received, and the receipt time t6 of the DelayRequest message is stored in the form of the counter value which is the output of the clock unit 111.

(n) Next, a DelayResponse message is sent to the slave device 120B from the message sending unit 113 of the master device 110. The DelayResponse message contains the time information representing the time t6 when the DelayRequest message is received by the message receiving unit 114 as a value in a nanosecond (ns) unit. In this case, the counter value representing the time t6 is converted to a value in a nanosecond (ns) unit by the counter-value/ns converter 113*a* of the message sending unit 113.

(p) In the message receiving unit 123 of the slave device 120B, the DelayResponse message sent from the master device 110 is received, and the value in a nanosecond (ns) unit representing the time t6 is acquired. Moreover, this value is converted to the counter value, which is the output of the clock unit 121 and represents the time t6, by the ns/counter-value converter 123*a*, and stored in the message receiving unit 123.

(q) Next, in the calculation unit 125B of the slave device 120B, Delay={(t4−t3)+(t2−t1)}/2 is calculated (see the equation (3)). In this case, the counter values, which are stored in the message receiving unit 123 and represent the times t1, t2, and t4, and the counter value which is stored in the message sending unit 124 and represents the time t3, are used. Moreover, in the estimate calculation unit 127, the Delay calculated by the calculation unit 125 is added to the counter value which is stored in the message sending unit 124 and represents the time t5, whereby an estimate t6'=t5+Delay is calculated (see the equation (10)).

In the estimate calculation unit 127, the time t6 stored in the message receiving unit 123 is compared with the estimate t'6, and a correction command corresponding to the comparison result is output. That is to say, if t6>t6', then the frequency of the slave clocks CLKs is determined to be low, and a correction command Fu for frequency increase is output. On the other hand, if t6<t6', then the frequency of the slave clocks CLKs is determined to be high, and a correction command Fd for frequency decrease is output.

In this way, in the frequency correction unit 128, the value of the output digital signal DS is changed based on the correction command output from the estimate calculation unit 127, and the control voltage VC supplied to the slave clock generator 122 is changed, whereby the frequency of the clocks CLKs is controlled. Therefore, a change in the counter values on the clock unit 121 can be matched to an ideal change in the counter values, conforming to the change in the counter values on the clock unit 121 of the master device 110.

Therefore, by repeating periodically the time synchronization operation illustrated in FIG. 7, the time on the slave device 120B can typically be made in agreement with the time on the master device 110 rather than only at the time of correcting the offset. Thus, the slave device 120B is able to achieve perfect time synchronization with the master device 110.

As described above, in the electronic equipment system 100B illustrated in FIG. 6, the same time synchronization operation as that in the electronic equipment system 100 illustrated in FIG. 1 is performed. In this case, the slave device 120B corrects the frequency of the clocks CLKs of the slave clock generator 122 based on the estimate t6' serving as the second value in addition to the correction of the time on the clock unit 121 based on the first value (first correction value and second correction value). Therefore, by repeating the correction of the time and the correction of the clock frequency, the time on the slave device 120B can typically be made in agreement with the time on the master device 110 rather than only at the time of correcting the offset. Thus, the slave device 120B is able to achieve perfect time synchronization with the master device 110.

Moreover, according to the time synchronization operation performed in the electronic equipment system 100B illustrated in FIG. 6, the time on the clock unit 121 of the slave device 120B is corrected in two stages. In the first stage of correction, the first correction value "(t2−t1)" is used which is calculated by subtracting the first time t1, at which a message is issued by the master device 110, from the second time t2 at which the message is received. Then, the time St(x) on the clock unit 121 of the slave device 120B is corrected so that the time St(x) has a value subtracted by the first correction value. In this way, the corrected time St(x)' has a value corresponding to a subtraction of a transmission delay component (Delay) between the master device 110 and the slave device 120B from the time Mt(x) on the clock unit 111 of the master device 110. Thus, the corrected time St(x)' is in a state such that an offset component (Offset) is excluded.

Moreover, in the second stage of correction, the second correction value " (t4−t3)/2" is used which is calculated by subtracting the third time t3, at which a message is sent, from the fourth time t4, at which the message is received by the master device 110, and dividing a subtraction result obtained thus by 2. Then, the corrected time St(x)' on the clock unit 121 of the slave device 120B is corrected so that the corrected time St(x)' has a value subtracted by the second correction value. In this way, the corrected time St(x)' on the clock unit 121 of the slave device 120B is in agreement with the time Mt(x) on the clock unit 111 of the master device 110, and thus time synchronization is achieved.

Therefore, in the electronic equipment system 100B illustrated in FIG. 6, the time on the clock unit 121 of the slave device 120B is not corrected using the result of the offset calculation containing such an error as in the case of the related art. For this reason, the slave device 120B is able to achieve time synchronization with the master device 110 with high precision.

On the contrary, according to the time synchronization operation of the related art, the Offset is calculated by the above-mentioned equation (1). In this case, since {(t2−t1)−(t4−t3)} is divided by 2, the result of the offset calculation will typically contain an error of 0.5. Therefore, when the time on the clock unit is corrected using the result of the offset calculation containing such an error, the slave device will be unable to achieve time synchronization with the master device with high precision.

4. Modified Embodiment

The above-described electronic equipment system 100B according to the third embodiment may be configured similarly to the above-described electronic equipment system 100A according to the second embodiment. That is to say, the Message message may be sent from the master device 110 to the slave device 120B, in which the time information of the times t1, t4, and t6 is conveyed in the form of the counter value. In this manner, by sending the time information from the master device 110 to the slave device 120B in the form of the counter value, it is not necessary to perform the operation where the master device converts the counter value to the value in a nanosecond (ns) unit, and the operation where the slave device converts the value in a nanosecond (ns) unit to the counter value.

For this reason, the time information of the times t1, t4, and t6 supplied from the master device 110 to the slave device 120B will be accurate time information containing no calculation errors during the conversion. Therefore, the calculation unit 125B is able to calculate the first correction value "(t2−t1)" and the second correction value "(t4−t3)/2" with high precision. Moreover, the calculation unit 125B is able to calculate the Delay with high precision. Furthermore, the estimate calculation unit 127 is able to calculate the estimate t6'=t5+Delay with high precision and compare the estimate t6' and the actual receipt time t6 with high precision. Accordingly, the slave device 120B is able to achieve time synchronization with the master device 110 with higher precision.

Moreover, in the embodiments described above, the PTP message is used as the message exchanged between the master device 100 or 110A and the slave device 120, 120A, or 120B; however, the present invention is not limited to this.

Moreover, in the embodiments described above, the calculation unit 125 or 125B and the correction unit 126 or 126B are separately provided in the slave device 120, 120A, or 120B, however, the block configuration of the slave device 120, 120A, or 120B is not limited to this. For example, the calculation unit 125 or 125B and the correction unit 126 or 126B may be configured as one processing block.

The embodiment of the present invention enables realization of time synchronization between slave devices and a master device with high precision. Therefore, the present invention can be applied to a camera system requiring time synchronization among a plurality of video cameras, a control system requiring time synchronization between a controlling device and controlled devices, and other systems requiring such time synchronization.

The present application contains subject matter related to that disclosed in Japanese Priority Patent Application JP 2009-045102 filed in the Japan Patent Office on Feb. 27, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A slave device comprising:
a clock unit that is configured by a counter so as to output time information;
a clock generation unit that generates clocks for counting up the counter;
a message receiving unit that receives messages sent from a master device;
a message sending unit that sends messages to the master device;
a first calculation unit that calculates a first value necessary for correcting the time on the clock unit;
a first correction unit that corrects the time on the clock unit based on the first value calculated by the first calculation unit;
a second calculation unit that calculates a second value necessary for correcting a frequency of the clocks generated by the clock generation unit; and
a second correction unit that corrects the frequency of the clocks generated by the clock generation unit based on the second value calculated by the second calculation unit, wherein:
the message receiving unit receives a first message that the master device issued at a first time and a second message that contains time information representing the first time and that the master device issued at a time later than the first time;
the message sending unit issues a third message to the master device at a third time;
the message receiving unit receives a fourth message that contains time information representing a fourth time at which the third message is received, the fourth message being issued after the third message is received by the master device;
the first calculation unit calculates a first subtraction result by subtracting the first time represented by the time information which is contained in the second message received by the message receiving unit from a second time which is the time at which the first message is received by the message receiving unit and calculates a second subtraction result by subtracting the third time at which the third message is issued by the message sending unit from the fourth time represented by the time information which is contained in the fourth message received by the message receiving unit, thereby calculating the first value by subtracting the second subtraction result from the first subtraction result and dividing a subtraction result obtained thus by 2;
the first correction unit corrects the time on the clock unit so that the time has a value subtracted by the first value calculated by the first calculation unit;
the message sending unit issues a fifth message to the master device at a fifth time after the time on the clock unit is corrected by the first correction unit;
the message receiving unit receives a sixth message containing the time information representing a sixth time at which the fifth message is received, the sixth message being issued after the fifth message is received by the master device;
the second calculation unit calculates the second value by adding an averaged sum of the first subtraction result and the second subtraction result calculated by the first calculation unit to the fifth time at which the fifth message is issued by the message sending unit; and
the second correction unit corrects the frequency of the clocks generated by the clock generation unit so that the clock frequency is increased when the second value calculated by the second calculation unit is smaller than the sixth time represented by the time information which is contained in the sixth message received by the message receiving unit, and the clock frequency is decreased when the second value is larger than the sixth time.

2. The slave device according to claim 1, wherein the time information which is contained in the second, fourth, and sixth messages received by the message receiving unit is a counter value.

3. A time synchronization method in a slave device, the method comprising:
  a first message receiving step of receiving a first message that a master device issued at a first time;
  a second message receiving step of receiving a second message that contains time information representing the first time and that the master device issued at a time later than the first time;
  a first message sending step of issuing a third message to the master device at a third time;
  a third message receiving step of receiving a fourth message that contains time information representing a fourth time at which the third message is received, the fourth message being issued after the third message is received by the master device;
  a first calculation step of calculating a first subtraction result by subtracting the first time represented by the time information which is contained in the second message received in the second message receiving step from a second time which is the time at which the first message is received in the first message receiving step and calculating a second subtraction result by subtracting the third time at which the third message is issued in the first message receiving step from the fourth time represented by the time information which is contained in the fourth message received in the third message receiving step, thereby calculating a first value by subtracting the second subtraction result from the first subtraction result and dividing a subtraction result obtained thus by 2;
  a time correction step of correcting the time on a clock unit that is configured by a counter so as to output time information so that the time has a value subtracted by the first value calculated in the first calculation step;
  a second message sending step of issuing a fifth message to the master device at a fifth time after the time on the clock unit is corrected in the time correction step;
  a fourth message receiving step of receiving a sixth message containing the time information representing a sixth time at which the fifth message is received, the sixth message being issued after the fifth message is received by the master device;
  a second calculation step of calculating a second value by adding an averaged sum of the first subtraction result and the second subtraction result calculated in the first calculation step to the fifth time at which the fifth message is issued in the second message sending step; and
  a clock-frequency correction step of correcting the frequency of the clocks for counting the counter of the clock unit so that the clock frequency is increased when the second value calculated in the second calculation step is smaller than the sixth time represented by the time information which is contained in the sixth message received in the fourth message receiving step, and the clock frequency is decreased when the second value is larger than the sixth time.

4. An electronic equipment system comprising:
  a master device; and
  slave devices, wherein
  the master device includes
    a clock unit that is configured by a counter so as to output time information;
    a clock generation unit that generates clocks for counting up the counter;
    a message sending unit that sends messages to the slave devices, and
    a message receiving unit that receives messages sent from the slave devices,
  the message sending unit issues a first message to the slave devices at a first time and issues a second message containing time information representing the first time to the slave devices at a time later than the first time,
  the message receiving unit receives a third message that one of the slave devices issued at a third time,
  the message sending unit issues a fourth message containing time information representing a fourth time at which the third message is received by the slave device, after the third message is received by the message receiving unit,
  the message receiving unit receives a fifth message that the slave device issued at a fifth time later than the third time,
  the message sending unit issues a sixth message containing time information representing a sixth time, at which the fifth message is received, to the slave device, after the fifth message is received by the message receiving unit,
  each of the slave devices includes
    a clock unit that is configured by a counter so as to output time information,
    a clock generation unit that generates clocks for counting up the counter,
    a message receiving unit that receives messages sent from the master device,
    a message sending unit that sends messages to the master device,
    a first calculation unit that calculates a first value necessary for correcting the time on the clock unit,
    a first correction unit that corrects the time on the clock unit based on the first value calculated by the first calculation unit,
    a second calculation unit that calculates a second value necessary for correcting a frequency of the clocks generated by the clock generation unit, and
    a second correction unit that corrects the frequency of the clocks generated by the clock generation unit based on the second value calculated by the second calculation unit,
  the message receiving unit receives a first message that the master device issued at a first time and a second message that contains time information representing the first time and that the master device issued at a time later than the first time,
  the message sending unit issues a third message to the master device at a third time,
  the message receiving unit receives a fourth message that contains time information representing a fourth time at which the third message is received, the fourth message being issued after the third message is received by the master device,
  the first calculation unit calculates a first subtraction result by subtracting the first time represented by the time information which is contained in the second message received by the message receiving unit from a second time which is the time at which the first message is received by the message receiving unit and calculates a second subtraction result by subtracting the third time at which the third message is issued by the message sending unit from the fourth time represented by the time information which is contained in the fourth message received by the message receiving unit, thereby calculating the first value by subtracting the second subtraction result from the first subtraction result and dividing a subtraction result obtained thus by 2, the first correction unit corrects the time on the clock unit so that the time has a value subtracted by the first value calculated by the first calculation unit, the message sending unit issues a fifth message to the master device at a fifth time after the time on the clock unit is corrected by the first correction unit, the message receiving unit receives a sixth message containing the time information representing a sixth time at which the fifth message is received, the sixth message being issued after the fifth message is received by the master device, the second calculation unit calculates the second value by adding an averaged sum of the first subtraction result and the second subtraction result calculated by the first calculation unit to the fifth time at which the fifth message is issued by the message sending unit, and the second correction unit corrects the frequency of the clocks generated by the clock generation unit so that the clock frequency is increased when the second value calculated by the second calculation unit is smaller than the sixth time represented by the time information which is contained in the sixth message received by the message receiving unit, and the clock frequency is decreased when the second value is larger than the sixth time.

5. A slave device comprising:

a clock unit that is configured by a counter so as to output time information;

a clock generation unit that generates clocks for counting up the counter;

a message receiving unit that receives messages sent from a master device;

a message sending unit that sends messages to the master device;

a first calculation unit that calculates a first value necessary for correcting the time on the clock unit;

a first correction unit that corrects the time on the clock unit based on the first value calculated by the first calculation unit;

a second calculation unit that calculates a second value necessary for correcting a frequency of the clocks generated by the clock generation unit; and a second correction unit that corrects the frequency of the clocks generated by the clock generation unit based on the second value calculated by the second calculation unit, wherein:

the message receiving unit receives a first message that the master device issued at a first time and a second message that contains time information representing the first time and that the master device issued at a time later than the first time;

the first calculation unit calculates a first correction value as the first value by subtracting the first time represented by the time information which is contained in the second message received by the message receiving unit from a second time which is the time at which the first message is received by the message receiving unit;

the first correction unit performs a first stage of correction so that the time on the clock unit has a value subtracted by the first correction value calculated by the first calculation unit;

the message sending unit issues a third message to the master device at a third time after the first stage of correction is performed by the first correction unit;

the message receiving unit receives a fourth message containing the time information representing a fourth time at which the third message is received, the fourth message being issued after the third message is received by the master device;

the first calculation unit calculates a second correction value as the first value by subtracting the third time at which the third message is issued by the message sending unit from the fourth time represented by the time information which is contained in the fourth message received by the message receiving unit and dividing a subtraction result obtained thus by 2;

the first correction unit performs a second stage of correction so that the time on the clock unit has a value added by the second correction value calculated by the first calculation unit, after the first stage of correction is performed;

the message sending unit issues a fifth message to the master device at a fifth time after the second stage of correction is performed by the first correction unit;

the message receiving unit receives a sixth message containing the time information representing a sixth time at which the fifth message is received, the sixth message being issued after the fifth message is received by the master device;

the second calculation unit calculates a first subtraction result by subtracting the first time represented by the time information which is contained in the second message received by the message receiving unit from a second time which is the time at which the first message is received by the message receiving unit and calculates a second subtraction result by subtracting the third time at which the third message is issued by the message sending unit from the fourth time represented by the time information which is contained in the fourth message received by the message receiving unit, thereby calculating the second value by adding an averaged sum of the first subtraction result and the second subtraction result to the fifth time at which the fifth message is issued by the message sending unit; and the second correction unit corrects the frequency of the clocks generated by the clock generation unit so that the clock frequency is increased when the second value calculated by the second calculation unit is smaller than the sixth time represented by the time information which is contained in the sixth message received by the message receiving unit, and the clock frequency is decreased when the second value is larger than the sixth time.

6. The slave device according to claim 5, wherein the time information which is contained in the second, fourth, and sixth messages received by the message receiving unit is a counter value.

7. A time synchronization method in a slave device, the method comprising:

a first message receiving step of receiving a first message that a master device issued at a first time;

a second message receiving step of receiving a second message that contains time information representing the first time and that the master device issued at a time later than the first time;

a first calculation step of calculating a first correction value by subtracting the first time represented by the time information which is contained in the second message received in the second message receiving step from a second time which is the time at which the first message is received in the first message receiving step;

a first time correction step of performing a first stage of correction so that the time of a clock unit that is configured by a counter so as to output time information has a value subtracted by the first correction value calculated in the first calculation step;

a first message sending step of issuing a third message to the master device at a third time after the first stage of correction is performed in the first time correction step;

a third message receiving step of receiving a fourth message containing the time information representing a fourth time at which the third message is received, the fourth message being issued after the third message is received by the master device;

a second calculation step of calculating a second correction value by subtracting the third time at which the third message is issued in the message sending step from the fourth time represented by the time information which is contained in the fourth message received in the third message receiving step and dividing a subtraction result obtained thus by 2;

a second time correction step of performing a second stage of correction so that the time on the clock unit has a value added by the second correction value calculated in the second calculation step;

a second message sending step of issuing a fifth message to the master device at a fifth time after the time on the clock unit is corrected in the second time correction step;

a fourth message receiving step of receiving a sixth message containing the time information representing a sixth time at which the fifth message is received, the sixth message being issued after the fifth message is received by the master device;

a third calculation step of calculating a first subtraction result by subtracting the first time represented by the time information which is contained in the second message received in the second message receiving step from the second time at which the first message is received in the first message receiving step and calculates a second subtraction result by subtracting the third time at which the third message is issued in the first message sending step from the fourth time represented by the time information which is contained in the fourth message received in the third message receiving step, thereby calculating an estimate by adding an averaged sum of the first subtraction result and the second subtraction result to the fifth time at which the fifth message is issued in the second message sending step; and a clock-frequency correction step of correcting the frequency of the clocks for counting up the counter of the clock unit so that the clock frequency is increased when the estimate calculated in the third calculation step is smaller than the sixth time represented by the time information which is contained in the sixth message received in the fourth message receiving step, and the clock frequency is decreased when the estimate is larger than the sixth time.

8. An electronic equipment system comprising:

a master device; and slave devices, wherein the master device includes a clock unit that is configured by a counter so as to output time information, a clock generation unit that generates clocks for counting up the counter, a message sending unit that sends messages to the slave devices, and a message receiving unit that receives messages sent from the slave devices the message sending unit issues a first message to the slave devices at a first time and issues a second message containing time information representing the first time to the slave devices at a time later than the first time, the message receiving unit receives a third message that one of the slave devices issued at a third time, the message sending unit issues a fourth message containing time information representing a fourth time at which the third message is received by the slave device, after the third message is received by the message receiving unit, the message receiving unit receives a fifth message that the slave device issued at a fifth time later than the third time, the message sending unit issues a sixth message containing time information representing a sixth time, at which the fifth message is received, to the slave device, after the fifth message is received by the message receiving unit, each of the slave devices includes a clock unit that is configured by a counter so as to output time information, a clock generation unit that generates clocks for counting up the counter, a message receiving unit that receives messages sent from the master device, a message sending unit that sends messages to the master device, a first calculation unit that calculates a first value necessary for correcting the time on the clock unit, a first correction unit that corrects the time on the clock unit based on the first value calculated by the first calculation unit, a second calculation unit that calculates a second value necessary for correcting a frequency of the clocks generated by the clock generation unit, a second correction unit that corrects the frequency of the clocks generated by the clock generation unit based on the second value calculated by the second calculation unit, the message receiving unit receives a first message that the master device issued at a first time and a second message that contains time information representing the first time and that the master device issued at a time later than the first time, the first calculation unit calculates a first correction value as the first value by subtracting the first time represented by the time information which is contained in the second message received by the message receiving unit from a second time which is the time at which the first message is received by the message receiving unit, the first correction unit performs a first stage of correction so that the time on the clock unit has a value subtracted by the first correction value calculated by the first calculation unit, the message sending unit issues a third message to the master device at a third time after the first stage of correction is performed by the first correction unit, the message receiving unit receives a fourth message containing the time information representing a fourth time at which the third message is received, the fourth message being issued after the third message is received by the master device, the first calculation unit calculates a second correction value as the first value by subtracting the third time at which the third message is issued by the message sending unit from the fourth time represented by the time information which is contained in the fourth message received by the message receiving unit and dividing a subtraction result obtained thus by 2, the first correction unit performs a second stage of correction so that the time on the clock unit has a value added by the second correction value calculated by the first calculation unit, after the first stage of correction is performed, the message sending unit issues a fifth message to the master device at a fifth time after the second stage of correction is performed by the first correction unit, the message receiving unit receives a sixth message containing the time information representing a sixth time at which the fifth message is received, the sixth message being issued after the fifth message is received by the master device, the second calculation unit calculates a first subtraction result by subtracting the first time represented by the time information which is contained in the second message received by the message receiving unit from a second time which is the time at which the first message is received by the message receiving unit and calculates a second subtraction result by subtracting the third time at which the third message is issued by the message sending unit from the fourth time represented by the time information which is contained in the fourth message received by the message receiving unit, thereby calculating the second value by adding an averaged sum of the first subtraction result and the second subtraction result to the fifth time at which the fifth message is issued by the message sending unit, and the second correction unit corrects the frequency of the clocks generated by the clock generation unit so that the clock frequency is increased when the second value calculated by the second calculation unit is smaller than the sixth time represented by the time information which is contained in the sixth message received by the message receiving unit, and the clock frequency is decreased when the second value is larger than the sixth time.

* * * * *